United States Patent
Kumagai et al.

[11] Patent Number: 5,945,204
[45] Date of Patent: *Aug. 31, 1999

[54] MULTILAYER FILM STRUCTURE FOR SOFT X-RAY OPTICAL ELEMENTS

[75] Inventors: Hiroshi Kumagai; Kouichi Toyoda, both of Wako, Japan

[73] Assignee: Ridagaku Kenkyusho, Saitama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/587,506

[22] Filed: Jan. 17, 1996

[30] Foreign Application Priority Data

Jan. 19, 1995 [JP] Japan .................................. 7-024706

[51] Int. Cl.$^6$ .................................................. C23C 14/06
[52] U.S. Cl. ............................ 428/212; 428/701; 428/702; 359/586; 359/587; 359/589
[58] Field of Search ..................................... 428/472, 701, 428/702, 698, 216, 212; 359/586, 587, 589

[56] References Cited

U.S. PATENT DOCUMENTS

| | | |
|---|---|---|
| 5,091,244 | 2/1992 | Biornard ................................. 428/216 |
| 5,170,291 | 12/1992 | Szczyrbowski et al. ............... 359/580 |
| 5,239,566 | 8/1993 | Nakamura et al. . |
| 5,270,858 | 12/1993 | Dickey ..................................... 359/585 |
| 5,310,603 | 5/1994 | Fukuda et al. ........................... 428/469 |
| 5,413,864 | 5/1995 | Miyazaki et al. ....................... 428/432 |

FOREIGN PATENT DOCUMENTS 0183471  6/1986  European Pat. Off. .

OTHER PUBLICATIONS

Patent Abstracts of Japan, vol. 015, No. 149 (P–1190), Apr. 15, 1991 & JP 03–021897 (Jan. 30, 1991).
Patent Abstracts of Japan, vol. 017, No. 163 (P–1513), Mar. 30, 1993 & JP 04–326098 (Nov. 16, 1992).
Patent Abstracts of Japan, vol. 018, No. 454 (P–1791), Aug. 24, 1994 & JP 06–148399 (May 27, 1994).
Patent Abstracts of Japan, vol. 95, No. 004, May 31, 1994, & MP 07–005298 (Jan. 10, 1995).

*Primary Examiner*—Archene Turner

[57] ABSTRACT

In order to provide a multilayer film structure for soft X-ray optical elements in which a high reflectivity can be attained in even a soft X-ray wavelength region of a wavelength of 10 nm or less including the wavelength range of water window zone, in a multilayer film structure for soft X-ray optical elements wherein a first thin film, being a different type of a second thin film, and the second thin film are piled up in layers to form a multi-layer film, at least one of the aforesaid first thin film and the aforesaid second thin film is made to be an oxide thin film.

11 Claims, 48 Drawing Sheets

Fresnel Coefficient in Normal Incidence of 3.98nm Wavelength

FIG. 3
(a)
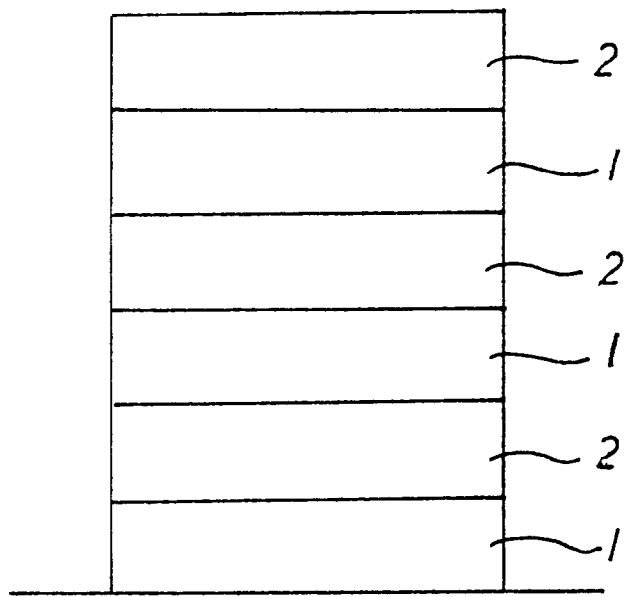
(b)
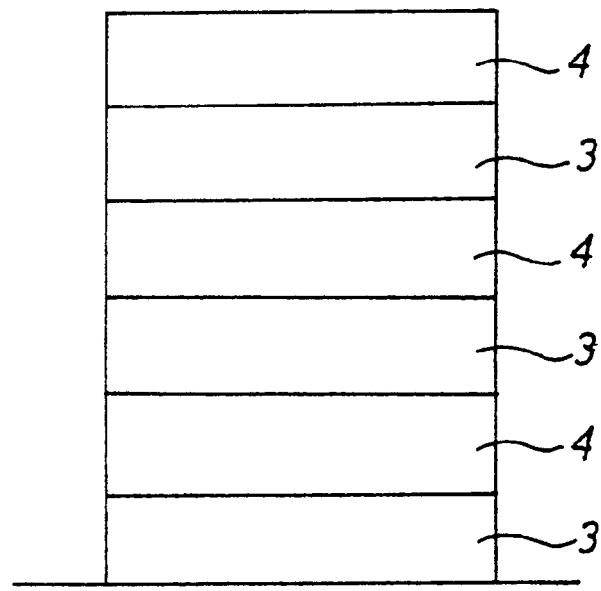

FIG. 4

OXIDE COMPONENT

LITHIUM OXIDE, BERYLLIUM OXIDE, BORON OXIDE, SODIUM OXIDE

CALCIUM OXIDE, SCANDIUM OXIDE, RHODIUM OXIDE, PALLADIUM OXIDE

MAGNESIUM OXIDE, ALUMINUM OXIDE, SILICON OXIDE, PHOSPHORUS OXIDE

TITANIUM OXIDE, VANADIUM OXIDE, CHROMIUM OXIDE, RUTHENIUM OXIDE,
SILVER OXIDE

CADMIUM OXIDE, INDIUM OXIDE

MANGANESE OXIDE, IRON OXIDE, COBALT OXIDE, NICKEL OXIDE,
COPPER OXIDE, ZINC OXIDE

GALLIUM OXIDE, GERMANIUM OXIDE, TIN OXIDE, ANTIMONY OXIDE,
TELLURIUM OXIDE

CESIUM OXIDE, BARIUM OXIDE, LANTHANUM OXIDE, CERIUM OXIDE,
PRASEODYMIUM OXIDE, NEODYMIUM OXIDE, SAMARIUM OXIDE,
EUROPIUM OXIDE

GADOLINIUM OXIDE

FIG. 5

○ GROUP OF ELEMENTS

A1 GROUP
LITHIUM (Li), BERYLLIUM (Be), BORON (B), CARBON (C), SODIUM (Na),
CALCIUM (Ca), SCANDIUM (Sc), RHODIUM (Rh), PALLADIUM (Pd)

B1 GROUP
MAGNESIUM (Mg), ALUMINUM (Al), SILICON (Si), PHOSPHORUS (P),
SULFUR (S), TITANIUM (Ti), VANADIUM (V), CHROMIUM (Cr),
RUTHENIUM (Ru), SILVER (Ag), CADMIUM (Cd), INDIUM (In)

C1 GROUP
MANGANESE (Mn), IRON (Fe), COBALT (Co), NICKEL (Ni), COPPER (Cu),
ZINC (Zn), GALLIUM (Ga), GERMANIUM (Ge), TIN (Sn), ANTIMONY (Sb),
TELLURIUM (Te)

D1 GROUP
CESIUM (Cs), BARIUM (Ba), LANTHANUM (La), CERIUM (Ce),
PRASEODYMIUM (Pr), NEODYMIUM (Nd), SAMARIUM (Sm), EUROPIUM (Eu),
GADOLINIUM (Gd)

○ GROUP OF OXIDES

A2 GROUP
LITHIUM OXIDE, BERYLLIUM OXIDE, BORON OXIDE, SODIUM OXIDE,
CALCIUM OXIDE, SCANDIUM OXIDE, RHODIUM OXIDE, PALLADIUM OXIDE

B2 GROUP
MAGNESIUM OXIDE, ALUMINUM OXIDE, SILICON OXIDE, PHOSPHORUS OXIDE,
TITANIUM OXIDE, VANADIUM OXIDE, CHROMIUM OXIDE, RUTHENIUM OXIDE,
SILVER OXIDE, CADMIUM OXIDE, INDIUM OXIDE

C2 GROUP
MANGANESE OXIDE, IRON OXIDE, COBALT OXIDE, NICKEL OXIDE,
COPPER OXIDE, ZINC OXIDE, GALLIUM OXIDE, GERMANIUM OXIDE,
TIN OXIDE, ANTIMONY OXIDE, TELLURIUM OXIDE

D2 GROUP
CESIUM, BARIUM OXIDE, LANTHANUM OXIDE, CERIUM OXIDE,
PRASEODYMIUM OXIDE, NEODYMIUM OXIDE, SAMARIUM OXIDE,
EUROPIUM OXIDE, GADOLINIUM OXIDE

Fresnel Coefficients (@ 3.98 nm)

NiO/TiO₂ multilayer $\lambda = 3.98$ nm
multilayer
$N = 50$

A: NiO  1.5 nm
TiO₂  1.3 nm
$\theta = 44.4°$
Rs/Rp = 10.83%/0%

B: NiO  2.1 nm
TiO₂  1.9 nm
$\theta = 59.8°$
Rs/Rp = 27.07%/8.34% = 3.2

C: NiO  4.2 nm
TiO₂  3.8 nm
$\theta = 74.9°$
Rs/Rp = 46.16%/41.29% = 1.1

D#i1221F(20TMA/40/20H2O2/40)

FIG. 17

A. OXIDE THIN FILM
1. [ALUMINUM OXIDE]
2. [ZIRCONIUM OXIDE]
3. [YTTRIUM OXIDE]
4. [HAFNIUM OXIDE]
5. [SCANDIUM OXIDE]
6. [TITANIUM OXIDE]
7. [MAGNESIUM OXIDE]
8. [SILICON OXIDE]
9. [BERYLLIUM OXIDE]
10. [BISMUTH OXIDE]
11. [GALLIUM OXIDE]
12. [GERMANIUM OXIDE]
13. [INDIUM OXIDE]
14. [LEAD OXIDE]
15. [ANTIMONY OXIDE]
16. [ZINC OXIDE]
17. [TUNGSTEN OXIDE]
18. [MOLYBDENUM OXIDE]
19. [VANADIUM OXIDE]
20. [COPPER OXIDE]
21. [NICKEL OXIDE]
22. [IRON OXIDE]
23. [MANGANESE OXIDE]
24. [CHROMIUM OXIDE]

B. HALIDE THIN FILM
1. [MAGNESIUM FLUORIDE]
2. [CALCIUM FLUORIDE]
3. [SODIUM FLUORIDE]
4. [LITHIUM FLUORIDE]
5. [LANTHANUM FLUORIDE]
6. [NEODYMIUM FLUORIDE]

C. SULFIDE THIN FILM
1. [ZINC SULFIDE]

D. SELENIDE THIN FILM
1. [ZINC SELENIDE]

E. TELLURIDE OXIDE THIN FILM
1. [ZINC TELLURIDE]

F. NITRIDE THIN FILM
1. [ALUMINUM NITRIDE]
2. [ZIRCONIUM NITRIDE]
3. [YTTRIUM NITRIDE]
4. [HAFNIUM NITRIDE]
5. [SCANDIUM NITRIDE]
6. [TITANIUM NITRIDE]
7. [MAGNESIUM NITRIDE]
8. [SILICON NITRIDE]
9. [BERYLLIUM NITRIDE]
10. [BISMUTH NITRIDE]
11. [GALLIUM NITRIDE]
12. [GERMANIUM NITRIDE]
13. [INDIUM NITRIDE]
14. [LEAD NITRIDE]
15. [ANTIMONY NITRIDE]
16. [ZINC NITRIDE]
17. [TUNGSTEN NITRIDE]
18. [MOLYBDENUM NITRIDE]
19. [VANADIUM NITRIDE]
20. [COPPER NITRIDE]
21. [NICKEL NITRIDE]
22. [IRON NITRIDE]
23. [MANGANESE NITRIDE]
24. [CHROMIUM NITRIDE]

NOTE THAT THE FOLLOWING CONDITIONS ARE MEANT IN FIGS.18 THROUGH 47.
   NO MARK: GAS AT 20°C UNDER 1 atm.
      ○ : LIQUID AT 20°C UNDER 1 atm. REQUIRED FOR USE OF VAPOR PRESSURE OR HEATING
      △ : SOLID REQUIRED OR HEATING
AcAc: ABBR. OF ACETYLACETONE
DPM: ABBR. OF DIPIVALOYL METHANE
HFA: ABBR. OF HEXAFLUOROACETYLACETONE
Cp: ABBR. OF CYCLOPENTADIENYL GROUP
MeCp: ABBR. OF METHYLCYCLOPENTADIENYL GROUP
i-PrCp: ABBR. OF ISOPROPYLCYCLOPENTADIENYL GROUP

FIG. 18

A. OXIDE THIN FILM

1. [ALUMINUM OXIDE]

| METALLIC COMPOUND TO FORM THIN FILM | OXIDIZING AGENT TO FORM THIN FILM | SUBSTRATE |
|---|---|---|
| △AlF$_3$ | O | Si |
| △AlCl$_3$ | O$_2$ | SiO$_2$ |
| △AlBr$_3$ | O$_3$ | GaAs |
| △AlI$_3$ | N$_2$O | GaP |
| △Al(OCH$_3$)$_3$ | NO$_2$ | InP |
| △Al(OC$_2$H$_5$)$_3$ | N$_2$O$_4$ | InAs |
| △Al(i-OC$_3$H$_7$)$_3$ | H$_2$O$_2$ | OTHER SEMICONDUCTOR SUBSTRATE |
| △Al(OC$_4$H$_9$)$_3$ | H$_2$O | MgO |
| ○Al(CH$_3$)$_3$ | D$_2$O | Al$_2$O$_3$ |
| ○Al(C$_2$H$_5$)$_3$ | | GLASS |
| ○Al(C$_3$H$_7$)$_3$ | | OTHER INSULATING SUBSTRATE |
| ○Al(i-C$_4$H$_9$)$_3$ | | METAL |
| ○Al(CH$_3$)$_2$Cl | | PLASTICS |
| △Al(CH$_3$)Cl$_2$ | | POLYMER |
| △Al$_2$(CH$_3$)$_3$Cl$_3$ | | STAINLESS STEEL |
| ○Al(C$_2$H$_5$)$_2$Cl | | |
| ○Al(C$_2$H$_5$)Cl$_2$ | | |
| ○Al$_2$O$_3$ | | |
| ○Al(CH$_3$)$_2$H | | |
| ○Al(C$_2$H$_5$)$_2$H | | |
| ○Al(i-C$_4$H$_9$)$_2$H | | |
| △AlH$_3$·N(CH$_3$)$_3$ | | |
| ○AlH$_3$·N(C$_2$H$_5$)$_3$ | | |
| ○AlH$_3$·N(CH$_3$)$_2$(C$_2$H$_5$) | | |
| ○AlH$_3$·N(C$_3$H$_7$)$_3$ | | |
| ○AlH$_3$·N(C$_4$H$_9$)$_3$ | | |

2. [ZIRCONIUM OXIDE]

| METALLIC COMPOUND TO FORM THIN FILM | OXIDIZING AGENT TO FORM THIN FILM | SUBSTRATE |
|---|---|---|
| △ZrF$_4$ | O | Si |
| △ZrCl$_4$ | O$_2$ | SiO$_2$ |
| △ZrBr$_4$ | O$_3$ | GaAs |
| △ZrI$_4$ | N$_2$O | GaP |
| △Zr(OCH$_3$)$_4$ | NO$_2$ | InP |
| △Zr(OC$_2$H$_5$)$_4$ | N$_2$O$_4$ | InAs |
| △Zr(OC$_3$H$_7$)$_4$ | H$_2$O$_2$ | OTHER SEMICONDUCTOR SUBSTRATE |
| △Zr(OC$_4$H$_9$)$_4$ | H$_2$O | MgO |
| △ZrO$_2$ | D$_2$O | Al$_2$O$_3$ |
| △Zr(AcAc)$_4$ | | GLASS |
| △Zr(DPM)$_4$ | | OTHER INSULATING SUBSTRATE |
| △Zr(HFA)$_4$ | | METAL |
| △Zr(BH$_4$)$_4$ | | PLASTICS |
| ○Zr[N(CH$_3$)$_2$]$_4$ | | POLYMER |
| ○Zr[N(C$_2$H$_5$)$_2$]$_4$ | | STAINLESS STEEL |

FIG. 19

3. [YTTRIUM OXIDE]

| METALLIC COMPOUND TO FORM THIN FILM | OXIDIZING AGENT TO FORM THIN FILM | SUBSTRATE |
|---|---|---|
| △Y $F_3$ | O | Si |
| △Y $Cl_3$ | $O_2$ | $SiO_2$ |
| △$Y_2O_3$ | $O_3$ | GaAs |
| △Y $(AcAc)_3$ | $N_2O$ | GaP |
| △Y $(DPM)_3$ | $NO_2$ | InP |
| △Y $(HFA)_3$ | $N_2O_4$ | InAs |
| | $H_2O_2$ | OTHER SEMICONDUCTOR SUBSTRATE |
| | $H_2O$ | MgO |
| | $D_2O$ | $Al_2O_3$ |
| | | GLASS |
| | | OTHER INSULATING SUBSTRATE |
| | | METAL |
| | | PLASTICS |
| | | POLYMER |
| | | STAINLESS STEEL |

4. [HAFNIUM OXIDE]

| METALLIC COMPOUND TO FORM THIN FILM | OXIDIZING AGENT TO FORM THIN FILM | SUBSTRATE |
|---|---|---|
| △Hf $Cl_4$ | O | Si |
| △Hf $Br_4$ | $O_2$ | $SiO_2$ |
| △Hf $O_2$ | $O_3$ | GaAs |
| △Hf $(AcAc)_4$ | $N_2O$ | GaP |
| △Hf $(DPM)_4$ | $NO_2$ | InP |
| △Hf $(HFA)_4$ | $N_2O_4$ | InAs |
| | $H_2O_2$ | OTHER SEMICONDUCTOR SUBSTRATE |
| | $H_2O$ | MgO |
| | $D_2O$ | $Al_2O_3$ |
| | | GLASS |
| | | OTHER INSULATING SUBSTRATE |
| | | METAL |
| | | PLASTICS |
| | | POLYMER |
| | | STAINLESS STEEL |

FIG. 20

5. [SCANDIUM OXIDE]

| METALLIC COMPOUND TO FORM THIN FILM | OXIDIZING AGENT TO FORM THIN FILM | SUBSTRATE |
|---|---|---|
| △$Sc_2O_3$ | O | Si |
| | $O_2$ | $SiO_2$ |
| | $O_3$ | GaAs |
| | $N_2O$ | GaP |
| | $NO_2$ | InP |
| | $N_2O_4$ | InAs |
| | $H_2O_2$ | OTHER SEMICONDUCTOR SUBSTRATE |
| | $H_2O$ | MgO |
| | $D_2O$ | $Al_2O_3$ |
| | | GLASS |
| | | OTHER INSULATING SUBSTRATE |
| | | METAL |
| | | PLASTICS |
| | | POLYMER |
| | | STAINLESS STEEL |

6. [TITANIUM OXIDE]

| METALLIC COMPOUND TO FORM THIN FILM | OXIDIZING AGENT TO FORM THIN FILM | SUBSTRATE |
|---|---|---|
| △$TiCl_3$ | O | Si |
| ○$TiCl_4$ | $O_2$ | $SiO_2$ |
| △$AlBr_4$ | $O_3$ | GaAs |
| △$TiI_4$ | $N_2O$ | GaP |
| △$Ti(OCH_3)_4$ | $NO_2$ | InP |
| ○$Ti(OC_2H_5)_4$ | $N_2O_4$ | InAs |
| ○$Ti(OC_3H_7)_4$ | $H_2O_2$ | OTHER SEMICONDUCTOR SUBSTRATE |
| ○$Ti(OC_4H_9)_4$ | $H_2O$ | MgO |
| △$TiO_2$ | $D_2O$ | $Al_2O_3$ |
| △$Ti(AcAc)_4$ | | GLASS |
| △$Ti(AcAc)_2Cl_2$ | | OTHER INSULATING SUBSTRATE |
| △$Ti(DPM)_4$ | | METAL |
| △$Ti(HFA)_2Cl_2$ | | PLASTICS |
| | | POLYMER |
| | | STAINLESS STEEL |

FIG. 21

7. [MAGNESIUM OXIDE]

| METALLIC COMPOUND TO FORM THIN FILM | OXIDIZING AGENT TO FORM THIN FILM | SUBSTRATE |
|---|---|---|
| △ $MgF_2$ | O | Si |
| △ $MgCl_2$ | $O_2$ | $SiO_2$ |
| △ $MgBr_2$ | $O_3$ | GaAs |
| △ $MgI_2$ | $N_2O$ | GaP |
| △ $Mg(OCH_3)_2$ | $NO_2$ | InP |
| △ $Mg(OC_2H_5)_2$ | $N_2O_4$ | InAs |
| △ $Mg(OC_3H_7)_2$ | $H_2O_2$ | OTHER SEMICONDUCTOR SUBSTRATE |
| △ $Mg(OC_4H_9)_2$ | $H_2O$ | MgO |
| △ MgO | $D_2O$ | $Al_2O_3$ |
| △ $MgCO_3$ | | GLASS |
| △ $Mg(AcAc)_2$ | | OTHER INSULATING SUBSTRATE |
| △ $Mg(DPM)_2$ | | METAL |
| △ $Mg(HFA)_2$ | | PLASTICS |
| | | POLYMER |
| | | STAINLESS STEEL |

8. [SILICON OXIDE]

| METALLIC COMPOUND TO FORM THIN FILM | OXIDIZING AGENT TO FORM THIN FILM | SUBSTRATE |
|---|---|---|
| $SiF_4$ | O | Si |
| ○ $SiCl_4$ | $O_2$ | $SiO_2$ |
| ○ $SiBr_4$ | $O_3$ | GaAs |
| △ $SiI_4$ | $N_2O$ | GaP |
| ○ $Si(OCH_3)_4$ | $NO_2$ | InP |
| ○ $Si(OC_2H_5)_4$ | $N_2O_4$ | InAs |
| ○ $Si(i-OC_3H_7)_4$ | $H_2O_2$ | OTHER SEMICONDUCTOR SUBSTRATE |
| △ $Si(t-OC_4H_9)_4$ | $H_2O$ | MgO |
| ○ $Si(CH_3)_4$ | $D_2O$ | $Al_2O_3$ |
| ○ $Si(C_2H_5)_4$ | | GLASS |
| ○ $Si(C_3H_7)_4$ | | OTHER INSULATING SUBSTRATE |
| ○ $Si(C_4H_9)_4$ | | METAL |
| ○ $Si(CH_3)_3Cl$ | | PLASTICS |
| ○ $Si(CH_3)_2Cl_2$ | | POLYMER |
| ○ $Si_2(CH_3)Cl_3$ | | STAINLESS STEEL |
| ○ $Si(C_2H_5)_3Cl$ | | |
| ○ $Si(C_2H_5)Cl_3$ | | |
| ○ $SiHCl_3$ | | |
| ○ $SiHBr_3$ | | |
| ○ $Si(C_2H_5)_2Cl_2$ | | |
| △ $SiO_2$ | | |

FIG. 22

9. [BERYLLIUM OXIDE]

| METALLIC COMPOUND TO FORM THIN FILM | OXIDIZING AGENT TO FORM THIN FILM | SUBSTRATE |
|---|---|---|
| △$BeF_2$ | O | Si |
| △$BeCl_2$ | $O_2$ | $SiO_2$ |
| △$BeBr_2$ | $O_3$ | GaAs |
| △$BeI_2$ | $N_2O$ | GaP |
| △$Be(CH_3)_2$ | $NO_2$ | InP |
| ○$Be(C_2H_5)_2$ | $N_2O_4$ | InAs |
| ○$Be(C_3H_7)_2$ | $H_2O_2$ | OTHER SEMICONDUCTOR SUBSTRATE |
| ○$Be(C_4H_9)_2$ | $H_2O$ | MgO |
| △BeO | $D_2O$ | $Al_2O_3$ |
| | | GLASS |
| | | OTHER INSULATING SUBSTRATE |
| | | METAL |
| | | PLASTICS |
| | | POLYMER |
| | | STAINLESS STEEL |

10. [BISMUTH OXIDE]

| METALLIC COMPOUND TO FORM THIN FILM | OXIDIZING AGENT TO FORM THIN FILM | SUBSTRATE |
|---|---|---|
| △$BiF_3$ | O | Si |
| △$BiCl_3$ | $O_2$ | $SiO_2$ |
| △$BiBr_3$ | $O_3$ | GaAs |
| △$BiI_3$ | $N_2O$ | GaP |
| ○$Bi(CH_3)_3$ | $NO_2$ | InP |
| △$BiCl_2$ | $N_2O_4$ | InAs |
| △$Bi_2O_3$ | $H_2O_2$ | OTHER SEMICONDUCTOR SUBSTRATE |
| △BiOCl | $H_2O$ | MgO |
| △$Bi(AcAc)_3$ | $D_2O$ | $Al_2O_3$ |
| △$Bi(DPM)_3$ | | GLASS |
| △$Bi(HFA)_3$ | | OTHER INSULATING SUBSTRATE |
| | | METAL |
| | | PLASTICS |
| | | POLYMER |
| | | STAINLESS STEEL |

FIG. 23

11. [GALLIUM OXIDE]

| METALLIC COMPOUND TO FORM THIN FILM | OXIDIZING AGENT TO FORM THIN FILM | SUBSTRATE |
|---|---|---|
| △ $GaF_3$ | ○ O | Si |
| △ $GaCl_3$ | $O_2$ | $SiO_2$ |
| △ $GaBr_3$ | $O_3$ | GaAs |
| △ $GaI_3$ | $N_2O$ | GaP |
| △ $Ga(OCH_3)_3$ | $NO_2$ | InP |
| △ $Ga(OC_2H_5)_3$ | $N_2O_4$ | InAs |
| △ $Ga(OC_3H_7)_3$ | $H_2O_2$ | OTHER SEMICONDUCTOR SUBSTRATE |
| △ $Ga(OC_4H_9)_3$ | $H_2O$ | MgO |
| ○ $Ga(CH_3)_3$ | $D_2O$ | $Al_2O_3$ |
| ○ $Ga(C_2H_5)_3$ | | GLASS |
| ○ $Ga(C_3H_7)_3$ | | OTHER INSULATING SUBSTRATE |
| ○ $Ga(C_4H_9)_3$ | | METAL |
| △ $Ga(CH_3)_2Cl$ | | PLASTICS |
| △ $Ga(CH_3)Cl_2$ | | POLYMER |
| | | STAINLESS STEEL |
| ○ $Ga(C_2H_5)_2Cl$ | | |
| △ $Ga(C_2H_5)Cl_2$ | | |
| ○ $Ga_2O_3$ | | |
| △ $Ga(AcAc)_3$ | | |
| △ $Ga(DPM)_3$ | | |
| △ $Ga(HFA)_3$ | | |

12. [GERMANIUM OXIDE]

| METALLIC COMPOUND TO FORM THIN FILM | OXIDIZING AGENT TO FORM THIN FILM | SUBSTRATE |
|---|---|---|
| $GeF_4$ | ○ O | Si |
| ○ $GeCl_4$ | $O_2$ | $SiO_2$ |
| ○ $GeBr_4$ | $O_3$ | GaAs |
| △ $GeI_4$ | $N_2O$ | GaP |
| ○ $Ge(OCH_3)_4$ | $NO_2$ | InP |
| ○ $Ge(OC_2H_5)_4$ | $N_2O_4$ | InAs |
| △ $Ge(OC_3H_7)_4$ | $H_2O_2$ | OTHER SEMICONDUCTOR SUBSTRATE |
| △ $Ge(OC_4H_9)_4$ | $H_2O$ | MgO |
| ○ $Ge(CH_3)_4$ | $D_2O$ | $Al_2O_3$ |
| ○ $Ge(C_2H_5)_4$ | | GLASS○ |
| ○ $Ge(C_3H_7)_4$ | | OTHER INSULATING SUBSTRATE |
| ○ $Ge(C_4H_9)_4$ | | METAL |
| ○ $Ge(CH_3)_2Cl_2$ | | PLASTICS |
| ○ $Ge(CH_3)Cl_3$ | | POLYMER |
| ○ $Ge(CH_3)_3Cl$ | | STAINLESS STEEL |
| ○ $Ge(C_2H_5)_2Cl_2$ | | |
| ○ $Ge(C_2H_5)Cl_3$ | | |
| △ $GeO_2$ | | |

FIG. 24

13. [INDIUM OXIDE]

| METALLIC COMPOUND TO FORM THIN FILM | OXIDIZING AGENT TO FORM THIN FILM | SUBSTRATE |
|---|---|---|
| △In $F_3$ | O | Si |
| △In $Cl_3$ | $O_2$ | $SiO_2$ |
| △In $Br_3$ | $O_3$ | GaAs |
| △In $I_3$ | $N_2O$ | GaP |
|  | $NO_2$ | InP |
|  | $N_2O_4$ | InAs |
|  | $H_2O_2$ | OTHER SEMICONDUCTOR SUBSTRATE |
|  | $H_2O$ | MgO |
| △In $(CH_3)_3$ | $D_2O$ | $Al_2O_3$ |
| ◯In $(C_2H_5)_3$ |  | GLASS |
| ◯In $(C_3H_7)_3$ |  | OTHER INSULATING SUBSTRATE |
| ◯In $(C_4H_9)_3$ |  | METAL |
| ◯$In_2O_3$ |  | PLASTICS |
| △In $(AcAc)_3$ |  | POLYMER |
| △In $(DPM)_3$ |  | STAINLESS STEEL |
| △In $(HFA)_3$ |  |  |

14. [LAED OXIDE]

| METALLIC COMPOUND TO FORM THIN FILM | OXIDIZING AGENT TO FORM THIN FILM | SUBSTRATE |
|---|---|---|
| △Pb $F_2$ | O | Si |
| △Pb $Cl_2$ | $O_2$ | $SiO_2$ |
| △Pb $Br_2$ | $O_3$ | GaAs |
| △Pb $I_2$ | $N_2O$ | GaP |
| △Pb $(CH_3)_4$ | $NO_2$ | InP |
| ◯Pb $(C_2H_5)_4$ | $N_2O_4$ | InAs |
| ◯Pb $(C_3H_7)_4$ | $H_2O_2$ | OTHER SEMICONDUCTOR SUBSTRATE |
| ◯Pb $(C_4H_9)_4$ | $H_2O$ | MgO |
| △Pb $O_2$ | $D_2O$ | $Al_2O_3$ |
| △Pb $(C_6H_5)_4$ |  | GLASS |
|  |  | OTHER INSULATING SUBSTRATE |
|  |  | METAL |
|  |  | PLASTICS |
|  |  | POLYMER |
|  |  | STAINLESS STEEL |

FIG. 25

15. [ANTIMONY OXIDE]

| METALLIC COMPOUND TO FORM THIN FILM | OXIDIZING AGENT TO FORM THIN FILM | SUBSTRATE |
|---|---|---|
| △ $Sb F_3$ | O | Si |
| △ $Sb Cl_3$ | $O_2$ | $SiO_2$ |
| △ $Sb Br_3$ | $O_3$ | GaAs |
| △ $Sb I_3$ | $N_2O$ | GaP |
| △ $Sb(OCH_3)_3$ | $NO_2$ | InP |
| ○ $Sb(OC_2H_5)_3$ | $N_2O_4$ | InAs |
| ○ $Sb(OC_3H_7)_3$ | $H_2O_2$ | OTHER SEMICONDUCTOR SUBSTRATE |
| ○ $Sb(OC_4H_9)_3$ | $H_2O$ | MgO |
| ○ $Sb(CH_3)_3$ | $D_2O$ | $Al_2O_3$ |
| ○ $Sb(C_2H_5)_3$ | | GLASS |
| ○ $Sb(C_3H_7)_3$ | | OTHER INSULATING SUBSTRATE |
| ○ $Sb(C_4H_9)_3$ | | METAL |
| △ $Sb_2O_3$ | | PLASTICS |
| ○ $Sb F_5$ | | POLYMER |
| ○ $Sb Cl_5$ | | STAINLESS STEEL |

16. [ZINC OXIDE]

| METALLIC COMPOUND TO FORM THIN FILM | OXIDIZING AGENT TO FORM THIN FILM | SUBSTRATE |
|---|---|---|
| △ $Zn F_2$ | O | Si |
| △ $Zn Cl_2$ | $O_2$ | $SiO_2$ |
| △ $Zn Br_2$ | $O_3$ | GaAs |
| △ $Zn I_2$ | $N_2O$ | GaP |
| △ $Zn(OCH_3)_2$ | $NO_2$ | InP |
| △ $Zn(OC_2H_5)_2$ | $N_2O_4$ | InAs |
| ○ $Zn(CH_3)_2$ | $H_2O_2$ | OTHER SEMICONDUCTOR SUBSTRATE |
| ○ $Zn(C_2H_5)_2$ | $H_2O$ | MgO |
| △ $Zn O$ | $D_2O$ | $Al_2O_3$ |
| △ $Zn CO_3$ | | GLASS |
| △ $Zn(AcAc)_2$ | | OTHER INSULATING SUBSTRATE |
| △ $Zn(DPM)_2$ | | METAL |
| △ $Zn(HFA)_2$ | | PLASTICS |
| | | POLYMER |
| | | STAINLESS STEEL |

FIG. 26

17. [TUNGSTEN OXIDE]

| METALLIC COMPOUND TO FORM THIN FILM | OXIDIZING AGENT TO FORM THIN FILM | SUBSTRATE |
|---|---|---|
| ○ $WF_6$ | O | Si |
| △ $WCl_6$ | $O_2$ | $SiO_2$ |
| △ $WO_2$ | $O_3$ | GaAs |
| △ $WO_3$ | $N_2O$ | GaP |
| | $NO_2$ | InP |
| | $N_2O_4$ | InAs |
| | $H_2O_2$ | OTHER SEMICONDUCTOR SUBSTRATE |
| | $H_2O$ | MgO |
| | $D_2O$ | $Al_2O_3$ |
| | | GLASS |
| | | OTHER INSULATING SUBSTRATE |
| | | METAL |
| | | PLASTICS |
| | | POLYMER |
| | | STAINLESS STEEL |

18. [MOLYBDENUM OXIDE]

| METALLIC COMPOUND TO FORM THIN FILM | OXIDIZING AGENT TO FORM THIN FILM | SUBSTRATE |
|---|---|---|
| ○ $MoF_6$ | O | Si |
| △ $MoCl_5$ | $O_2$ | $SiO_2$ |
| △ $MoO_2$ | $O_3$ | GaAs |
| △ $MoO_3$ | $N_2O$ | GaP |
| | $NO_2$ | InP |
| | $N_2O_4$ | InAs |
| | $H_2O_2$ | OTHER SEMICONDUCTOR SUBSTRATE |
| | $H_2O$ | MgO |
| | $D_2O$ | $Al_2O_3$ |
| | | GLASS |
| | | OTHER INSULATING SUBSTRATE |
| | | METAL |
| | | PLASTICS |
| | | POLYMER |
| | | STAINLESS STEEL |

FIG. 27

19. [VANADIUM OXIDE]

| METALLIC COMPOUND TO FORM THIN FILM | OXIDIZING AGENT TO FORM THIN FILM | SUBSTRATE |
|---|---|---|
| △V F$_3$ | O | Si |
| △V Cl$_3$ | O$_2$ | SiO$_2$ |
| △V Br$_3$ | O$_3$ | GaAs |
| △V I$_3$ | N$_2$O | GaP |
| △V O(OCH$_3$)$_3$ | NO$_2$ | InP |
| ○V O(OC$_2$H$_5$)$_3$ | N$_2$O$_4$ | InAs |
| ○V O(OC$_3$H$_7$)$_3$ | H$_2$O$_2$ | OTHER SEMICONDUCTOR SUBSTRATE |
| ○V O(OC$_4$H$_9$)$_3$ | H$_2$O | MgO |
| ○V OCl$_3$ | D$_2$O | Al$_2$O$_3$ |
| △V O | | GLASS |
| ○V Cl$_4$ | | OTHER INSULATING SUBSTRATE |
| △V$_2$O$_3$ | | METAL |
| | | PLASTICS |
| | | POLYMER |
| | | STAINLESS STEEL |

FIG. 28

20. [COPPER OXIDE]

| METALLIC COMPOUND TO FORM THIN FILM | OXIDIZING AGENT TO FORM THIN FILM | SUBSTRATE |
|---|---|---|
| △Cu $(C_5H_5)P(C_2H_5)_3$ | O | Si |
| △Cu $F_2$ | $O_2$ | $SiO_2$ |
| △Cu $Br_2$ | $N_2O$ | GaAs |
| △Cu $Cl_2$ | $NO_2$ | GaP |
| △Cu I | $N_2O_2$ | InP |
| △Cu Br | $H_2O_2$ | InAs |
| △Cu Cl | $H_2O$ | OTHER SEMICONDUCTOR SUBSTRATE |
| △$Cu_2$ O | $D_2O$ | MgO |
| △Cu O | | $Al_2O_3$ |
| △Cu $(AcAc)_2$ | | GLASS |
| △Cu $(DPM)_2$ | | OTHER INSULATING SUBSTRATE |
| △Cu $(HFA)_2$ | | METAL |
| | | PLASTICS |
| | | POLYMER |
| | | STAINLESS STEEL |

21. [NICKEL OXIDE]

| METALLIC COMPOUND TO FORM THIN FILM | OXIDIZING AGENT TO FORM THIN FILM | SUBSTRATE |
|---|---|---|
| △Ni $(C_5H_5)_2$ | O | Si |
| △Ni $(CH_3C_5H_4)_2$ | $O_2$ | $SiO_2$ |
| △Ni $F_2$ | $N_2O$ | GaAs |
| △Ni $Cl_2$ | $NO_2$ | GaP |
| △Ni $Br_2$ | $N_2O_2$ | InP |
| △Ni $I_2$ | $H_2O_2$ | InAs |
| △Ni O | $H_2O$ | OTHER SEMICONDUCTOR SUBSTRATE |
| △$Ni_2$ $O_3$ | $D_2O$ | MgO |
| △Ni $CO_3$ | | $Al_2O_3$ |
| △Ni $(AcAc)_2$ | | GLASS° |
| △Ni $(DPM)_2$ | | OTHER INSULATING SUBSTRATE |
| △Ni $(HFA)_2$ | | METAL |
| | | PLASTICS |
| | | POLYMER |
| | | STAINLESS STEEL |

FIG. 29

22. [IRON OXIDE]

| METALLIC COMPOUND TO FORM THIN FILM | OXIDIZING AGENT TO FORM THIN FILM | SUBSTRATE |
|---|---|---|
| △Fe $(C_5H_5)_2$ | O | Si |
| △Fe $(CH_3C_5H_4)_2$ | $O_2$ | $SiO_2$ |
| △Fe $F_2$ | $N_2O$ | GaAs |
| △Fe $Cl_2$ | $NO_2$ | GaP |
| △Fe $Br_2$ | $N_2O_2$ | InP |
| △Fe $I_2$ | $H_2O_2$ | InAs |
| △Fe O | $H_2O$ | OTHER SEMICONDUCTOR SUBSTRATE |
| △$Fe_2O_3$ | $D_2O$ | MgO |
| △$Fe_3O_4$ | | $Al_2O_3$ |
| △Fe $(AcAc)_2$ | | GLASS |
| △Fe $(DPM)_2$ | | OTHER INSULATING SUBSTRATE |
| △Fe $(HFA)_2$ | | METAL |
| △Fe $F_3$ | | PLASTICS |
| △Fe $Cl_3$ | | POLYMER |
| △Fe $Br_3$ | | STAINLESS STEEL |
| △Fe $(OCH_3)_3$ | | |
| △Fe $(OC_2H_5)_3$ | | |

23. [MANGANESE OXIDE]

| METALLIC COMPOUND TO FORM THIN FILM | OXIDIZING AGENT TO FORM THIN FILM | SUBSTRATE |
|---|---|---|
| △Mn $O_2$ | O | Si |
| △$Mn_2O_7$ | $O_2$ | $SiO_2$ |
| △Mn $F_2$ | $N_2O$ | GaAs |
| △Mn $Cl_2$ | $NO_2$ | GaP |
| △Mn $Br_2$ | $N_2O_2$ | InP |
| △Mn $I_2$ | $H_2O_2$ | InAs |
| △Mn O | $H_2O$ | OTHER SEMICONDUCTOR SUBSTRATE |
| △$Mn_2O_3$ | $D_2O$ | MgO |
| △$Mn_3O_4$ | | $Al_2O_3$ |
| △Mn $(AcAc)_2$ | | GLASS |
| △Mn $(DPM)_2$ | | OTHER INSULATING SUBSTRATE |
| △Mn $(HFA)_2 \cdot 2H_2O$ | | METAL |
| | | PLASTICS |
| | | POLYMER |
| | | STAINLESS STEEL |

FIG. 30

24. [CHROMIUM OXIDE]

| METALLIC COMPOUND TO FORM THIN FILM | OXIDIZING AGENT TO FORM THIN FILM | SUBSTRATE |
|---|---|---|
| △Cr $(C_5H_5)_2$ | O | Si |
| △Cr $(CH_3C_5H_4)_2$ | $O_2$ | $SiO_2$ |
| △Cr $F_2$ | $N_2O$ | GaAs |
| △Cr $Cl_2$ | $NO_2$ | GaP |
| △Cr $Br_2$ | $N_2O_2$ | InP |
| △Cr $O_2Cl_2$ | $H_2O_2$ | InAs |
|  | $H_2O$ | OTHER SEMICONDUCTOR SUBSTRATE |
| △$Cr_2O_3$ | $D_2O$ | MgO |
| △Cr $O_3$ |  | $Al_2O_3$ |
| △Cr $(AcAc)_2$ |  | GLASS |
| △Cr $(DPM)_2$ |  | OTHER INSULATING SUBSTRATE |
| △Cr $(HFA)_2$ |  | METAL |
| △Cr $F_3$ |  | PLASTICS |
| △Cr $Cl_3$ |  | POLYMER |
| △Cr $Br_3$ |  | STAINLESS STEEL |

FIG. 31

B. HALIDE THIN FILM

1. [MAGNESIUM FLUORIDE]

| METALLIC COMPOUND TO FORM THIN FILM | HALOGENATING AGENT TO FORM THIN FILM | SUBSTRATE |
|---|---|---|
| △$MgF_2$ | F | Si |
| △$MgCl_2$ | $F_2$ | $SiO_2$ |
| △$MgBr_2$ | $NF_3$ | GaAs |
| △$MgI_2$ | $CF_4$ | GaP |
| △$Mg(OCH_3)_2$ | $SF_6$ | InP |
| △$Mg(OC_2H_5)_2$ | HF | InAs |
| △$Mg(OC_3H_7)_2$ | | OTHER SEMICONDUCTOR SUBSTRATE |
| △$Mg(OC_4H_9)_2$ | | MgO |
| △MgO | | $Al_2O_3$ |
| △$MgCO_3$ | | GLASS |
| △$Mg(AcAc)_2$ | | OTHER INSULATING SUBSTRATE |
| △$Mg(DPM)_2$ | | METAL |
| △$Mg(HFA)_2$ | | PLASTICS |
| | | POLYMER |
| | | STAINLESS STEEL |

2. [CALCIUM FLUORIDE]

| METALLIC COMPOUND TO FORM THIN FILM | HALOGENATING AGENT TO FORM THIN FILM | SUBSTRATE |
|---|---|---|
| △$CaF_2$ | F | Si |
| △$CaCl_2$ | $F_2$ | $SiO_2$ |
| △$CaBr_2$ | $NF_3$ | GaAs |
| △$CaI_2$ | $CF_4$ | GaP |
| △$Ca(OCH_3)_2$ | $SF_6$ | InP |
| △$Ca(OC_2H_5)_2$ | HF | InAs |
| △$Ca(OC_3H_7)_2$ | | OTHER SEMICONDUCTOR SUBSTRATE |
| △$Ca(OC_4H_9)_2$ | | MgO |
| △CaO | | $Al_2O_3$ |
| △$CaCO_3$ | | GLASS |
| △$Ca(AcAc)_2$ | | OTHER INSULATING SUBSTRATE |
| △$Ca(DPM)_2$ | | METAL |
| △$Ca(HFA)_2$ | | PLASTICS |
| | | POLYMER |
| | | STAINLESS STEEL |

FIG. 32

3. [SODIUM FLUORIDE]

| METALLIC COMPOUND TO FORM THIN FILM | HALOGENATING AGENT TO FORM THIN FILM | SUBSTRATE |
|---|---|---|
| △Na F | F | Si |
| △Na Cl | $F_2$ | $SiO_2$ |
| △Na Br | $NF_3$ | GaAs |
| △Na I | $CF_4$ | GaP |
| △Na $OCH_3$ | $SF_6$ | InP |
| △Na $OC_2H_5$ | HF | InAs |
| △Na $OC_3H_7$ | | OTHER SEMICONDUCTOR SUBSTRATE |
| △Na $OC_4H_9$ | | MgO |
| | | $Al_2O_3$ |
| △$Na_2 CO_3$ | | GLASS |
| △Na (AcAc) | | OTHER INSULATING SUBSTRATE |
| △Na (DPM) | | METAL |
| △Na (HFA) | | PLASTICS |
| | | POLYMER |
| | | STAINLESS STEEL |

4. [LITHIUM FLUORIDE]

| METALLIC COMPOUND TO FORM THIN FILM | HALOGENATING AGENT TO FORM THIN FILM | SUBSTRATE |
|---|---|---|
| △Li F | F | Si |
| △Li Cl | $F_2$ | $SiO_2$ |
| △Li Br | $NF_3$ | GaAs |
| △Li I | $CF_4$ | GaP |
| △Li $OCH_3$ | $SF_6$ | InP |
| △Li $OC_2H_5$ | HF | InAs |
| △Li $OC_3H_7$ | | OTHER SEMICONDUCTOR SUBSTRATE |
| △Li $OC_4H_9$ | | MgO |
| △$Li_2 CO_3$ | | $Al_2O_3$ |
| | | GLASS |
| △Li $CH_3$ | | OTHER INSULATING SUBSTRATE |
| △Li $C_2H_5$ | | METAL |
| ○Li $C_3H_7$ | | PLASTICS |
| ○Li $C_4H_9$ | | POLYMER |
| △Li (AcAc) | | STAINLESS STEEL |
| △Li (DPM) | | |
| △Li (HFA) | | |
| △Li $N[(CH_3)_3Si]_2$ | | |

FIG. 33

5. [LANTHANUM FLUORIDE]

| METALLIC COMPOUND TO FORM THIN FILM | HALOGENATING AGENT TO FORM THIN FILM | SUBSTRATE |
|---|---|---|
| △ $LaF_3$ | F | Si |
| △ $LaCl_3$ | $F_2$ | $SiO_2$ |
| △ $LaBr_3$ | $NF_3$ | GaAs |
| △ $LaI_3$ | $CF_4$ | GaP |
| △ $La(OCH_3)_3$ | $SF_6$ | InP |
| △ $La(OC_2H_5)_3$ | HF | InAs |
| △ $La(i-OC_3H_7)_3$ | | OTHER SEMICONDUCTOR SUBSTRATE |
| △ $Cp_3La$ | | MgO |
| △ $MeCp_3La$ | | $Al_2O_3$ |
| △ $La_2(CO_3)_3$ | | GLASS |
| △ $(AcAc)_3La \cdot H_2O$ | | OTHER INSULATING SUBSTRATE |
| △ $(DPM)_3La$ | | METAL |
| △ $(HFA)_3La$ | | PLASTICS |
| | | POLYMER |
| | | STAINLESS STEEL |

6. [NEODYMIUM FLUORIDE]

| METALLIC COMPOUND TO FORM THIN FILM | HALOGENATING AGENT TO FORM THIN FILM | SUBSTRATE |
|---|---|---|
| △ $NdF_3$ | F | Si |
| △ $NdCl_3$ | $F_2$ | $SiO_2$ |
| △ $Cp_3Nd$ | $NF_3$ | GaAs |
| △ $MeCp_3Nd$ | $CF_4$ | GaP |
| △ $i-PrCp_3Nd$ | $SF_6$ | InP |
| △ $(AcAc)_3Nd \cdot H_2O$ | HF | InAs |
| △ $(DPM)_3Nd$ | | OTHER SEMICONDUCTOR SUBSTRATE |
| △ $(HFA)_3Nd$ | | MgO |
| | | $Al_2O_3$ |
| | | GLASS |
| | | OTHER INSULATING SUBSTRATE |
| | | METAL |
| | | PLASTICS |
| | | POLYMER |
| | | STAINLESS STEEL |

FIG. 34

C. SULFIDE THIN FILM

1. [ZINC SULFIDE]

| METALLIC COMPOUND TO FORM THIN FILM | SULFIDIZING AGENT TO FORM THIN FILM | SUBSTRATE |
|---|---|---|
| △Zn F$_2$ | △S | Si |
| △Zn Cl$_2$ | SF$_6$ | SiO$_2$ |
| △Zn Br$_2$ | ○S$_2$Cl$_2$ | GaAs |
| △Zn I$_2$ | ○SCl$_2$ | GaP |
| △Zn (OCH$_3$)$_2$ | ○SO$_2$Cl$_2$ | InP |
| △Zn (OC$_2$H$_5$)$_2$ | ○SOCl$_2$ | InAs |
| ○Zn (CH$_3$)$_2$ | | OTHER SEMICONDUCTOR SUBSTRATE |
| ○Zn (C$_2$H$_5$)$_2$ | | MgO |
| △Zn O | | Al$_2$O$_3$ |
| △Zn CO$_3$ | | GLASS |
| △Zn (AcAc)$_2$ | | OTHER INSULATING SUBSTRATE |
| △Zn (DPM)$_2$ | | METAL |
| △Zn (HFA)$_2$ | | PLASTICS |
| | | POLYMER |
| | | STAINLESS STEEL |

D. SELENIDE THIN FILM

1. [ZINC SELENIDE]

| METALLIC COMPOUND TO FORM THIN FILM | SELENIDING AGENT TO FORM THIN FILM | SUBSTRATE |
|---|---|---|
| △Zn F$_2$ | | Si |
| △Zn Cl$_2$ | | SiO$_2$ |
| △Zn Br$_2$ | ○Se$_2$Cl$_2$ | GaAs |
| △Zn I$_2$ | △SeCl$_4$ | GaP |
| △Zn (OCH$_3$)$_2$ | ○SeOCl$_2$ | InP |
| △Zn (OC$_2$H$_5$)$_2$ | | InAs |
| ○Zn (CH$_3$)$_2$ | ○Se$_2$Br$_2$ | OTHER SEMICONDUCTOR SUBSTRATE |
| ○Zn (C$_2$H$_5$)$_2$ | △SeBr$_4$ | MgO |
| △Zn O | ○Se (CH$_3$)$_2$ | Al$_2$O$_3$ |
| △Zn CO$_3$ | ○Se (C$_2$H$_5$)$_2$ | GLASS |
| △Zn (AcAc)$_2$ | | OTHER INSULATING SUBSTRATE |
| △Zn (DPM)$_2$ | | METAL |
| △Zn (HFA)$_2$ | | PLASTICS |
| | | POLYMER |
| | | STAINLESS STEEL |

FIG. 35

E. TELLURIDE THIN FILM
  1. [ZINC TELLURIDE]

| METALLIC COMPOUND TO FORM THIN FILM | TELLURIDING AGENT TO FORM THIN FILM | SUBSTRATE |
|---|---|---|
| △Zn $F_2$ | | Si |
| △Zn $Cl_2$ | | $SiO_2$ |
| △Zn $Br_2$ | △Te $Cl_2$ | GaAs |
| △Zn $I_2$ | △Te $I_4$ | GaP |
| △Zn $(OCH_3)_2$ | △Te$Br_4$ | InP |
| △Zn $(OC_2H_5)_2$ | | InAs |
| ○Zn $(CH_3)_2$ | | OTHER SEMICONDUCTOR SUBSTRATE |
| ○Zn $(C_2H_5)_2$ | | MgO |
| △Zn O | ○Te $(CH_3)_2$ | $Al_2O_3$ |
| △Zn $CO_3$ | ○Te $(C_2H_5)_2$ | GLASS |
| △Zn $(AcAc)_2$ | | OTHER INSULATING SUBSTRATE |
| △Zn $(DPM)_2$ | | METAL |
| △Zn $(HFA)_2$ | | PLASTICS |
| | | POLYMER |
| | | STAINLESS STEEL |

FIG. 36

F. NITRIDE THIN FILM

1. [ALUMINUM NITRIDE]

| METALLIC COMPOUND TO FORM THIN FILM | NITRIDING AGENT TO FORM THIN FILM | SUBSTRATE |
|---|---|---|
| △AlF$_3$ | N$_2$ | Si |
| △AlCl$_3$ | N | SiO$_2$ |
| △AlBr$_3$ | NH$_3$ | GaAs |
| △AlI$_3$ | | GaP |
| △Al(OCH$_3$)$_3$ | | InP |
| △Al(OC$_2$H$_5$)$_3$ | | InAs |
| △Al(i-OC$_3$H$_7$)$_3$ | | OTHER SEMICONDUCTOR SUBSTRATE |
| △Al(OC$_4$H$_9$)$_3$ | | MgO |
| ○Al(CH$_3$)$_3$ | | Al$_2$O$_3$ |
| ○Al(C$_2$H$_5$)$_3$ | | GLASS |
| ○Al(C$_3$H$_7$)$_3$ | | OTHER INSULATING SUBSTRATE |
| ○Al(i-C$_4$H$_9$)$_3$ | | METAL |
| ○Al(CH$_3$)$_2$Cl | | PLASTICS |
| △Al(CH$_3$)Cl$_2$ | | POLYMER |
| △Al$_2$(CH$_3$)$_3$Cl$_3$ | | STAINLESS STEEL |
| ○Al(C$_2$H$_5$)$_2$Cl | | |
| ○Al(C$_2$H$_5$)Cl$_2$ | | |
| ○Al$_2$O$_3$ | | |
| ○Al(CH$_3$)$_2$H | | |
| ○Al(C$_2$H$_5$)$_2$H | | |
| ○Al(i-C$_4$H$_9$)$_2$H | | |
| △AlH$_3$·N(CH$_3$)$_3$ | | |
| ○AlH$_3$·N(C$_2$H$_5$)$_3$ | | |
| ○AlH$_3$·N(CH$_3$)$_2$(C$_2$H$_5$) | | |
| ○AlH$_3$·N(C$_3$H$_7$)$_3$ | | |
| ○AlH$_3$·N(C$_4$H$_9$)$_3$ | | |

2. [ZIRCONIUM NITRIDE]

| METALLIC COMPOUND TO FORM THIN FILM | NITRIDING AGENT TO FORM THIN FILM | SUBSTRATE |
|---|---|---|
| △ZrF$_4$ | N$_2$ | Si |
| △ZrCl$_4$ | N | SiO$_2$ |
| △ZrBr$_4$ | NH$_3$ | GaAs |
| △ZrI$_4$ | | GaP |
| △Zr(OCH$_3$)$_4$ | | InP |
| △Zr(OC$_2$H$_5$)$_4$ | | InAs |
| △Zr(OC$_3$H$_7$)$_4$ | | OTHER SEMICONDUCTOR SUBSTRATE |
| △Zr(OC$_4$H$_9$)$_4$ | | MgO |
| △ZrO$_2$ | | Al$_2$O$_3$ |
| △Zr(AcAc)$_4$ | | GLASS |
| △Zr(DPM)$_4$ | | OTHER INSULATING SUBSTRATE |
| △Zr(HFA)$_4$ | | METAL |
| △Zr(BH$_4$)$_4$ | | PLASTICS |
| ○Zr[N(CH$_3$)$_2$]$_4$ | | POLYMER |
| ○Zr[N(C$_2$H$_5$)$_2$]$_4$ | | STAINLESS STEEL |

FIG. 37

3. [YTTRIUM NITRIDE]

| METALLIC COMPOUND TO FORM THIN FILM | NITRIDING AGENT TO FORM THIN FILM | SUBSTRATE |
|---|---|---|
| △Y F$_3$ | N$_2$ | Si |
| △Y Cl$_3$ | N | SiO$_2$ |
| △Y$_2$O$_3$ | NH$_3$ | GaAs |
| △Y (AcAc)$_3$ | | GaP |
| △Y (DPM)$_3$ | | InP |
| △Y (HFA)$_3$ | | InAs |
| | | OTHER SEMICONDUCTOR SUBSTRATE |
| | | MgO |
| | | Al$_2$O$_3$ |
| | | GLASS |
| | | OTHER INSULATING SUBSTRATE |
| | | METAL |
| | | PLASTICS |
| | | POLYMER |
| | | STAINLESS STEEL |

4. [HAFNIUM NITRIDE]

| METALLIC COMPOUND TO FORM THIN FILM | NITRIDING AGENT TO FORM THIN FILM | SUBSTRATE |
|---|---|---|
| △Hf Cl$_4$ | N$_2$ | Si |
| △Hf Br$_4$ | N | SiO$_2$ |
| △Hf O$_2$ | NH$_3$ | GaAs |
| △Hf (AcAc)$_4$ | | GaP |
| △Hf (DPM)$_4$ | | InP |
| △Hf (HFA)$_4$ | | InAs |
| | | OTHER SEMICONDUCTOR SUBSTRATE |
| | | MgO |
| | | Al$_2$O$_3$ |
| | | GLASS |
| | | OTHER INSULATING SUBSTRATE |
| | | METAL |
| | | PLASTICS |
| | | POLYMER |
| | | STAINLESS STEEL |

FIG. 38

5. [SCANDIUM NITRIDE]

| METALLIC COMPOUND TO FORM THIN FILM | NITRIDING AGENT TO FORM THIN FILM | SUBSTRATE |
|---|---|---|
| △ $Sc_2O_3$ | $N_2$ | Si |
| | N | $SiO_2$ |
| | $NH_3$ | GaAs |
| | | GaP |
| | | InP |
| | | InAs |
| | | OTHER SEMICONDUCTOR SUBSTRATE |
| | | MgO |
| | | $Al_2O_3$ |
| | | GLASS |
| | | OTHER INSULATING SUBSTRATE |
| | | METAL |
| | | PLASTICS |
| | | POLYMER |
| | | STAINLESS STEEL |

6. [TITANIUM NITRIDE]

| METALLIC COMPOUND TO FORM THIN FILM | NITRIDING AGENT TO FORM THIN FILM | SUBSTRATE |
|---|---|---|
| △ $TiCl_3$ | $N_2$ | Si |
| ○ $TiCl_4$ | N | $SiO_2$ |
| △ $AlBr_4$ | $NH_3$ | GaAs |
| △ $TiI_4$ | | GaP |
| △ $Ti(OCH_3)_4$ | | InP |
| ○ $Ti(OC_2H_5)_4$ | | InAs |
| ○ $Ti(OC_3H_7)_4$ | | OTHER SEMICONDUCTOR SUBSTRATE |
| ○ $Ti(OC_4H_9)_4$ | | MgO |
| △ $TiO_2$ | | $Al_2O_3$ |
| △ $Ti(AcAc)_4$ | | GLASS |
| △ $Ti(AcAc)_2Cl_2$ | | OTHER INSULATING SUBSTRATE |
| △ $Ti(DPM)_4$ | | METAL |
| △ $Ti(HFA)_2Cl_2$ | | PLASTICS |
| | | POLYMER |
| | | STAINLESS STEEL |

FIG. 39

7. [MAGNESIUM NITRIDE]

| METALLIC COMPOUND TO FORM THIN FILM | NITRIDING AGENT TO FORM THIN FILM | SUBSTRATE |
|---|---|---|
| △ $MgF_2$ | $N_2$ | Si |
| △ $MgCl_2$ | N | $SiO_2$ |
| △ $MgBr_2$ | $NH_3$ | GaAs |
| △ $MgI_2$ | | GaP |
| △ $Mg(OCH_3)_2$ | | InP |
| △ $Mg(OC_2H_5)_2$ | | InAs |
| △ $Mg(OC_3H_7)_2$ | | OTHER SEMICONDUCTOR SUBSTRATE |
| △ $Mg(OC_4H_9)_2$ | | MgO |
| △ $MgO$ | | $Al_2O_3$ |
| △ $MgCO_3$ | | GLASS |
| △ $Mg(AcAc)_2$ | | OTHER INSULATING SUBSTRATE |
| △ $Mg(DPM)_2$ | | METAL |
| △ $Mg(HFA)_2$ | | PLASTICS |
| | | POLYMER |
| | | STAINLESS STEEL |

8. [SILICON NITRIDE]

| METALLIC COMPOUND TO FORM THIN FILM | NITRIDING AGENT TO FORM THIN FILM | SUBSTRATE |
|---|---|---|
| $SiF_4$ | $N_2$ | Si |
| ○ $SiCl_4$ | N | $SiO_2$ |
| ○ $SiBr_4$ | $NH_3$ | GaAs |
| △ $SiI_4$ | | GaP |
| ○ $Si(OCH_3)_4$ | | InP |
| ○ $Si(OC_2H_5)_4$ | | InAs |
| ○ $Si(i-OC_3H_7)_4$ | | OTHER SEMICONDUCTOR SUBSTRATE |
| △ $Si(t-OC_4H_9)_4$ | | MgO |
| ○ $Si(CH_3)_4$ | | $Al_2O_3$ |
| ○ $Si(C_2H_5)_4$ | | GLASS |
| ○ $Si(C_3H_7)_4$ | | OTHER INSULATING SUBSTRATE |
| ○ $Si(C_4H_9)_4$ | | METAL |
| ○ $Si(CH_3)_3Cl$ | | PLASTICS |
| ○ $Si(CH_3)_2Cl_2$ | | POLYMER |
| ○ $Si_2(CH_3)Cl_3$ | | STAINLESS STEEL |
| ○ $Si(C_2H_5)_3Cl$ | | |
| ○ $Si(C_2H_5)Cl_3$ | | |
| ○ $SiHCl_3$ | | |
| ○ $SiHBr_3$ | | |
| ○ $Si(C_2H_5)_2Cl_2$ | | |
| △ $SiO_2$ | | |

FIG. 40

9. [BERYLLIUM NITRIDE]

| METALLIC COMPOUND TO FORM THIN FILM | NITRIDING AGENT TO FORM THIN FILM | SUBSTRATE |
|---|---|---|
| △Be $F_2$ | $N_2$ | Si |
| △Be $Cl_2$ | N | $SiO_2$ |
| △Be $Br_2$ | $NH_3$ | GaAs |
| △Be $I_2$ | | GaP |
| △Be $(CH_3)_2$ | | InP |
| ○Be $(C_2H_5)_2$ | | InAs |
| ○Be $(C_3H_7)_2$ | | OTHER SEMICONDUCTOR SUBSTRATE |
| ○Be $(C_4H_9)_2$ | | MgO |
| △Be O | | $Al_2O_3$ |
| | | GLASS |
| | | OTHER INSULATING SUBSTRATE |
| | | METAL |
| | | PLASTICS |
| | | POLYMER |
| | | STAINLESS STEEL |

10. [BISMUTH NITRIDE]

| METALLIC COMPOUND TO FORM THIN FILM | NITRIDING AGENT TO FORM THIN FILM | SUBSTRATE |
|---|---|---|
| △Bi $F_3$ | $N_2$ | Si |
| △Bi $Cl_3$ | N | $SiO_2$ |
| △Bi $Br_3$ | $NH_3$ | GaAs |
| △Bi $I_3$ | | GaP |
| ○Bi $(CH_3)_3$ | | InP |
| △Bi $Cl_2$ | | InAs |
| △$Bi_2O_3$ | | OTHER SEMICONDUCTOR SUBSTRATE |
| △Bi OCl | | MgO |
| △Bi $(AcAc)_3$ | | $Al_2O_3$ |
| △Bi $(DPM)_3$ | | GLASS |
| △Bi $(HFA)_3$ | | OTHER INSULATING SUBSTRATE |
| | | METAL |
| | | PLASTICS |
| | | POLYMER |
| | | STAINLESS STEEL |

FIG. 41

11. [GALLIUM NITRIDE]

| METALLIC COMPOUND TO FORM THIN FILM | NITRIDING AGENT TO FORM THIN FILM | SUBSTRATE |
|---|---|---|
| △ $GaF_3$ | $N_2$ | Si |
| △ $GaCl_3$ | N | $SiO_2$ |
| △ $GaBr_3$ | $NH_3$ | GaAs |
| △ $GaI_3$ | | GaP |
| △ $Ga(OCH_3)_3$ | | InP |
| △ $Ga(OC_2H_5)_3$ | | InAs |
| △ $Ga(OC_3H_7)_3$ | | OTHER SEMICONDUCTOR SUBSTRATE |
| △ $Ga(OC_4H_9)_3$ | | MgO |
| ○ $Ga(CH_3)_3$ | | $Al_2O_3$ |
| ○ $Ga(C_2H_5)_3$ | | GLASS |
| ○ $Ga(C_3H_7)_3$ | | OTHER INSULATING SUBSTRATE |
| ○ $Ga(C_4H_9)_3$ | | METAL |
| △ $Ga(CH_3)_2Cl$ | | PLASTICS |
| △ $Ga(CH_3)Cl_2$ | | POLYMER |
| | | STAINLESS STEEL |
| ○ $Ga(C_2H_5)_2Cl$ | | |
| △ $Ga(C_2H_5)Cl_2$ | | |
| ○ $Ga_2O_3$ | | |
| △ $Ga(AcAc)_3$ | | |
| △ $Ga(DPM)_3$ | | |
| △ $Ga(HFA)_3$ | | |

12. [GERMANIUM NITRIDE]

| METALLIC COMPOUND TO FORM THIN FILM | NITRIDING AGENT TO FORM THIN FILM | SUBSTRATE |
|---|---|---|
| $GeF_4$ | $N_2$ | Si |
| ○ $GeCl_4$ | N | $SiO_2$ |
| ○ $GeBr_4$ | $NH_3$ | GaAs |
| △ $GeI_4$ | | GaP |
| ○ $Ge(OCH_3)_4$ | | InP |
| ○ $Ge(OC_2H_5)_4$ | | InAs |
| △ $Ge(OC_3H_7)_4$ | | OTHER SEMICONDUCTOR SUBSTRATE |
| △ $Ge(OC_4H_9)_4$ | | MgO |
| ○ $Ge(CH_3)_4$ | | $Al_2O_3$ |
| ○ $Ge(C_2H_5)_4$ | | GLASS |
| ○ $Ge(C_3H_7)_4$ | | OTHER INSULATING SUBSTRATE |
| ○ $Ge(C_4H_9)_4$ | | METAL |
| ○ $Ge(CH_3)_2Cl_2$ | | PLASTICS |
| ○ $Ge(CH_3)Cl_3$ | | POLYMER |
| ○ $Ge(CH_3)_3Cl$ | | STAINLESS STEEL |
| ○ $Ge(C_2H_5)_2Cl_2$ | | |
| ○ $Ge(C_2H_5)Cl_3$ | | |
| △ $GeO_2$ | | |

FIG. 42

13. [INDIUM NITRIDE]

| METALLIC COMPOUND TO FORM THIN FILM | NITRIDING AGENT TO FORM THIN FILM | SUBSTRATE |
|---|---|---|
| △In $F_3$ | $N_2$ | Si |
| △In $Cl_3$ | N | $SiO_2$ |
| △In $Br_3$ | $NH_3$ | GaAs |
| △In $I_3$ | | GaP |
| | | InP |
| | | InAs |
| | | OTHER SEMICONDUCTOR SUBSTRATE |
| | | MgO |
| △In $(CH_3)_3$ | | $Al_2O_3$ |
| ○In $(C_2H_5)_3$ | | GLASS |
| ○In $(C_3H_7)_3$ | | OTHER INSULATING SUBSTRATE |
| ○In $(C_4H_9)_3$ | | METAL |
| ○In$_2$ $O_3$ | | PLASTICS |
| △In $(AcAc)_3$ | | POLYMER |
| △In $(DPM)_3$ | | STAINLESS STEEL |
| △In $(HFA)_3$ | | |

14. [LEAD NITRIDE]

| METALLIC COMPOUND TO FORM THIN FILM | NITRIDING AGENT TO FORM THIN FILM | SUBSTRATE |
|---|---|---|
| △Pb $F_2$ | $N_2$ | Si |
| △Pb $Cl_2$ | N | $SiO_2$ |
| △Pb $Br_2$ | $NH_3$ | GaAs |
| △Pb $I_2$ | | GaP |
| △Pb $(CH_3)_4$ | | InP |
| ○Pb $(C_2H_5)_4$ | | InAs |
| ○Pb $(C_3H_7)_4$ | | OTHER SEMICONDUCTOR SUBSTRATE |
| ○Pb $(C_4H_9)_4$ | | MgO |
| △Pb $O_2$ | | $Al_2O_3$ |
| △Pb $(C_6H_5)_4$ | | GLASS |
| | | OTHER INSULATING SUBSTRATE |
| | | METAL |
| | | PLASTICS |
| | | POLYMER |
| | | STAINLESS STEEL |

FIG. 43

15. [ANTIMONY NITRIDE]

| METALLIC COMPOUND TO FORM THIN FILM | NITRIDING AGENT TO FORM THIN FILM | SUBSTRATE |
|---|---|---|
| △Sb $F_3$ | $N_2$ | Si |
| △Sb $Cl_3$ | N | $SiO_2$ |
| △Sb $Br_3$ | $NH_3$ | GaAs |
| △Sb $I_3$ | | GaP |
| △Sb $(OCH_3)_3$ | | InP |
| ○Sb $(OC_2H_5)_3$ | | InAs |
| ○Sb $(OC_3H_7)_3$ | | OTHER SEMICONDUCTOR SUBSTRATE |
| ○Sb $(OC_4H_9)_3$ | | MgO |
| ○Sb $(CH_3)_3$ | | $Al_2O_3$ |
| ○Sb $(C_2H_5)_3$ | | GLASS |
| ○Sb $(C_3H_7)_3$ | | OTHER INSULATING SUBSTRATE |
| ○Sb $(C_4H_9)_3$ | | METAL |
| △$Sb_2O_3$ | | PLASTICS |
| ○Sb $F_5$ | | POLYMER |
| ○Sb $Cl_5$ | | STAINLESS STEEL |

16. [ZINC NITRIDE]

| METALLIC COMPOUND TO FORM THIN FILM | NITRIDING AGENT TO FORM THIN FILM | SUBSTRATE |
|---|---|---|
| △Zn $F_2$ | $N_2$ | Si |
| △Zn $Cl_2$ | N | $SiO_2$ |
| △Zn $Br_2$ | $NH_3$ | GaAs |
| △Zn $I_2$ | | GaP |
| △Zn $(OCH_3)_2$ | | InP |
| △Zn $(OC_2H_5)_2$ | | InAs |
| ○Zn $(CH_3)_2$ | | OTHER SEMICONDUCTOR SUBSTRATE |
| ○Zn $(C_2H_5)_2$ | | MgO |
| △Zn O | | $Al_2O_3$ |
| △Zn $CO_3$ | | GLASS |
| △Zn $(AcAc)_2$ | | OTHER INSULATING SUBSTRATE |
| △Zn $(DPM)_2$ | | METAL |
| △Zn $(HFA)_2$ | | PLASTICS |
| | | POLYMER |
| | | STAINLESS STEEL |

FIG. 44

17. [TUNGSTEN NITRIDE]

| METALLIC COMPOUND TO FORM THIN FILM | NITRIDING AGENT TO FORM THIN FILM | SUBSTRATE |
|---|---|---|
| ○ $WF_6$ | $N_2$ | Si |
| △ $WCl_6$ | N | $SiO_2$ |
| △ $WO_2$ | $NH_3$ | GaAs |
| △ $WO_3$ | | GaP |
| | | InP |
| | | InAs |
| | | OTHER SEMICONDUCTOR SUBSTRATE |
| | | MgO |
| | | $Al_2O_3$ |
| | | GLASS |
| | | OTHER INSULATING SUBSTRATE |
| | | METAL |
| | | PLASTICS |
| | | POLYMER |
| | | STAINLESS STEEL |

18. [MOLYBDENUM NITRIDE]

| METALLIC COMPOUND TO FORM THIN FILM | NITRIDING AGENT TO FORM THIN FILM | SUBSTRATE |
|---|---|---|
| ○ $MoF_6$ | $N_2$ | Si |
| △ $MoCl_5$ | N | $SiO_2$ |
| △ $MoO_2$ | $NH_3$ | GaAs |
| △ $MoO_3$ | | GaP |
| | | InP |
| | | InAs |
| | | OTHER SEMICONDUCTOR SUBSTRATE |
| | | MgO |
| | | $Al_2O_3$ |
| | | GLASS |
| | | OTHER INSULATING SUBSTRATE |
| | | METAL |
| | | PLASTICS |
| | | POLYMER |
| | | STAINLESS STEEL |

FIG. 45

19. [VANADIUM NITRIDE]

| METALLIC COMPOUND TO FORM THIN FILM | NITRIDING AGENT TO FORM THIN FILM | SUBSTRATE |
|---|---|---|
| △V F$_3$ | N$_2$ | Si |
| △V Cl$_3$ | N | SiO$_2$ |
| △V Br$_3$ | NH$_3$ | GaAs |
| △V I$_3$ | | GaP |
| △V O(OCH$_3$)$_3$ | | InP |
| ○V O(OC$_2$H$_5$)$_3$ | | InAs |
| ○V O(OC$_3$H$_7$)$_3$ | | OTHER SEMICONDUCTOR SUBSTRATE |
| ○V O(OC$_4$H$_9$)$_3$ | | MgO |
| ○V OCl$_3$ | | Al$_2$O$_3$ |
| △V O | | GLASS |
| ○V Cl$_4$ | | OTHER INSULATING SUBSTRATE |
| △V$_2$O$_3$ | | METAL |
| | | PLASTICS |
| | | POLYMER |
| | | STAINLESS STEEL |

20. [COPPER NITRIDE]

| METALLIC COMPOUND TO FORM THIN FILM | NITRIDING AGENT TO FORM THIN FILM | SUBSTRATE |
|---|---|---|
| △Cu (C$_5$H$_5$)P(C$_2$H$_5$)$_3$ | N$_2$ | Si |
| △Cu F$_2$ | N | SiO$_2$ |
| △Cu Br$_2$ | NH$_3$ | GaAs |
| △Cu Cl$_2$ | | GaP |
| △Cu I | | InP |
| △Cu Br | | InAs |
| △Cu Cl | | OTHER SEMICONDUCTOR SUBSTRATE |
| △Cu$_2$O | | MgO |
| △Cu O | | Al$_2$O$_3$ |
| △Cu (AcAc)$_2$ | | GLASS |
| △Cu (DPM)$_2$ | | OTHER INSULATING SUBSTRATE |
| △Cu (HFA)$_2$ | | METAL |
| | | PLASTICS |
| | | POLYMER |
| | | STAINLESS STEEL |

FIG. 46

21. [NICKEL NITRIDE]

| METALLIC COMPOUND TO FORM THIN FILM | NITRIDING AGENT TO FORM THIN FILM | SUBSTRATE |
|---|---|---|
| △Ni $(C_5H_5)_2$ | $N_2$ | Si |
| △Ni $(CH_3C_5H_4)_2$ | N | $SiO_2$ |
| △Ni $F_2$ | $NH_3$ | GaAs |
| △Ni $Cl_2$ | | GaP |
| △Ni $Br_2$ | | InP |
| △Ni $I_2$ | | InAs |
| △Ni O | | OTHER SEMICONDUCTOR SUBSTRATE |
| △$Ni_2O_3$ | | MgO |
| △Ni $CO_3$ | | $Al_2O_3$ |
| △Ni (AcAc)$_2$ | | GLASS |
| △Ni (DPM)$_2$ | | OTHER INSULATING SUBSTRATE |
| △Ni (HFA)$_2$ | | METAL |
| | | PLASTICS |
| | | POLYMER |
| | | STAINLESS STEEL |

22. [IRON NITRIDE]

| METALLIC COMPOUND TO FORM THIN FILM | NITRIDING AGENT TO FORM THIN FILM | SUBSTRATE |
|---|---|---|
| △Fe $(C_5H_5)_2$ | $N_2$ | Si |
| △Fe $(CH_3C_5H_4)_2$ | N | $SiO_2$ |
| △Fe $F_2$ | $NH_3$ | GaAs |
| △Fe $Cl_2$ | | GaP |
| △Fe $Br_2$ | | InP |
| △Fe $I_2$ | | InAs |
| △Fe O | | OTHER SEMICONDUCTOR SUBSTRATE |
| △$Fe_2O_3$ | | MgO |
| △$Fe_3O_4$ | | $Al_2O_3$ |
| △Fe (AcAc)$_2$ | | GLASS |
| △Fe (DPM)$_2$ | | OTHER INSULATING SUBSTRATE |
| △Fe (HFA)$_2$ | | METAL |
| △Fe $F_3$ | | PLASTICS |
| △Fe $Cl_3$ | | POLYMER |
| △Fe $Br_3$ | | STAINLESS STEEL |
| △Fe $(OCH_3)_3$ | | |
| △Fe $(OC_2H_5)_3$ | | |

FIG. 47

23. [MANGANESE NITRIDE]

| METALLIC COMPOUND TO FORM THIN FILM | NITRIDING AGENT TO FORM THIN FILM | SUBSTRATE |
| --- | --- | --- |
| △$MnO_2$ | $N_2$ | Si |
| △$Mn_2O_7$ | N | $SiO_2$ |
| △$MnF_2$ | $NH_3$ | GaAs |
| △$MnCl_2$ | | GaP |
| △$MnBr_2$ | | InP |
| △$MnI_2$ | | InAs |
| △MnO | | OTHER SEMICONDUCTOR SUBSTRATE |
| △$Mn_2O_3$ | | MgO |
| △$Mn_3O_4$ | | $Al_2O_3$ |
| △$Mn(AcAc)_2$ | | GLASS |
| △$Mn(DPM)_2$ | | OTHER INSULATING SUBSTRATE |
| △$Mn(HFA)_2 \cdot 2H_2O$ | | METAL |
| | | PLASTICS |
| | | POLYMER |
| | | STAINLESS STEEL |

24. [CHROMIUM NITRIDE]

| METALLIC COMPOUND TO FORM THIN FILM | NITRIDING AGENT TO FORM THIN FILM | SUBSTRATE |
| --- | --- | --- |
| △$Cr(C_5H_5)_2$ | $N_2$ | Si |
| △$Cr(CH_3C_5H_4)_2$ | N | $SiO_2$ |
| △$CrF_2$ | $NH_3$ | GaAs |
| △$CrCl_2$ | | GaP |
| △$CrBr_2$ | | InP |
| △$CrO_2Cl_2$ | | InAs |
| | | OTHER SEMICONDUCTOR SUBSTRATE |
| △$Cr_2O_3$ | | MgO |
| △$CrO_3$ | | $Al_2O_3$ |
| △$Cr(AcAc)_2$ | | GLASS |
| △$Cr(DPM)_2$ | | OTHER INSULATING SUBSTRATE |
| △$Cr(HFA)_2$ | | METAL |
| △$CrF_3$ | | PLASTICS |
| △$CrCl_3$ | | POLYMER |
| △$CrBr_3$ | | STAINLESS STEEL | ns
MULTILAYER FILM STRUCTURE FOR SOFT X-RAY OPTICAL ELEMENTS

BACKGROUND OF THE INVENTION

1. Field of the Invention

This invention relates to a multilayer film structure for soft X-ray optical elements, and more particularly to a multilayer film structure for soft X-ray optical elements in which a high reflectivity can be attained.

2. Description of the Related Art

In soft X-ray field, research and development have been actively carried out recently with respect to reflecting mirrors, reflection type filters, or soft X-ray optical elements such as polarizers, transmission type elements and the like wherein ultra-thin films of two materials each having a thickness of about several nm and a suitable optical constant are alternately laminated to form a multilayer film structure, whereby constructive interference is realized with respect to soft X-ray.

Such soft X-ray optical elements are utilized in development of X-ray microscopes, X-ray telescopes, X-ray laser equipments, or the like.

Meanwhile, in a soft X-ray optical element having a multilayer film structure, reflectivity 58% (angle of incidence θ=3°) has been obtained at 13.8 nm wavelength by means of a Mo/Si multilayer film which is produced by laminating fifty (50) bi-layers of Mo and Si thin films (one bi-layer is formed from one set of a Mo thin film and an Si thin film, and the same shall apply hereinafter).

There has been, however, such a problem that no high reflectivity is obtained at a wavelength of 10 nm or less, for example, in a so-called "water window" zone (a wavelength of from 2.332 nm to 4.368 nm) being a wavelength region wherein C is absorbed, while O is not absorbed, shown in FIG. 1.

OBJECT AND SUMMARY OF THE INVENTION

The present invention has been made in view of the problem involved in the prior art as described above, and an object of the invention is to provide a multilayer film structure for soft X-ray optical elements in which a high reflectivity can be obtained even in a soft X-ray wavelength region of a wavelength of 10 nm or less including the wavelength range of water window zone.

In order to attain the above described object, the multilayer film structure for soft X-ray optical elements according to the present invention is the one for soft X-ray optical elements wherein a first thin film, being a different type of a second thin film, and the second thin film are piled up in layers to form a multilayer film, characterized in that at least one of the aforesaid first thin film and the aforesaid second thin film is made to be an oxide thin film.

To obtain a high reflectivity, it is required, in case of selecting a metallic material pair which constitutes a multilayer film, that a difference between the real parts of Fresnel coefficients of these metallic materials is bigger, while the imaginary parts of Fresnel coefficients themselves are smaller.

In this respect, however, for example, as shown in FIG. 2, since there is no combination of metallic materials which can increase a difference between the real parts of Fresnel coefficients in water window zone (a wavelength of 2.332 nm to 4.368 nm), it is difficult to obtain a high reflectivity.

For this reason, it has been proposed to obtain a high reflectivity by increasing the number of layers in a multilayer film. However, when the number of layers is increased, the roughness on a surface as well as an interface due to the formation of an alloy or a polycrystal in the interface between metallic materials increases, so that decrease in the reflectivity due to scattering loss becomes remarkable.

The present invention has been made with the aim of such fact that the oxygen in an oxide is transparent in water window zone, besides a difference between imaginary parts of Fresnel coefficients can be made smaller in the oxide than in the metal itself, and in addition the oxide can prevent the formation of an alloy in the interface between these materials.

More specifically, in a multilayer film structure for soft X-ray optical elements wherein a first thin film, being a different type of a second thin film, and the second thin film are piled up in layers to form a multilayer film, when at least one of the aforesaid first thin film and the aforesaid second thin film is made to be an oxide thin film, formation of an alloy in the interface between the first thin film and the second thin film is prevented, whereby roughness on the surface and in the interface of these first and second thin films can be prevented, besides the oxide thin film is transparent in water window zone so that this can reduce the absorption in soft X-ray range, and as a result a high reflectivity can be attained in soft X-ray wavelength region of a wavelength of 10 nm or less including the wavelength range of water window zone. As a matter of course, an oxide is not oxidized in the atmosphere anymore so that it is stable.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3(a) and 3(b) are conceptual views each showing the multilayer film structure for soft X-ray optical elements according to the present invention wherein FIG. 3(a) shows a case where a first oxide thin film and a second oxide thin film which is a different type oxide from that of the first thin film are alternately laminated, while FIG. 3(b) shows a case where a metal thin film and an oxide thin film are alternately laminated.

FIG. 4 is a table showing examples of the first oxide thin films, and the second oxide thin films according to the present invention as well as types of oxide capable of forming such oxide thin films.

FIG. 5 is a table showing a group of elements and a group of oxides both of them being capable of forming the first oxide thin films, the second oxide thin films and the metal thin films according to the present invention as well as being capable of forming such oxide thin films.

FIG. 17 is a table exemplifying, as the compound thin films capable of being formed in accordance with the present invention, 19 types of oxide thin films, 6 types of halide thin films, 1 type of sulfide thin film, 1 type of selenide thin film, and 1 type of telluride thin film, respectively.

FIG. 18 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 19 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 20 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 21 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 22 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 23 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 24 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 25 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 26 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 27 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 28 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 29 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 30 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 31 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 32 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 33 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 34 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 35 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 36 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 37 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 38 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 39 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 40 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 41 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 42 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 43 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 44 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 45 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 46 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

FIG. 47 is a table showing examples of each combination of the following components being applicable in case of forming the respective compound thin films shown in FIG. 17 in respect of a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film), respectively.

DETAILED DESCRIPTION OF THE PREFERRED EMBODIMENTS

Figure 1:
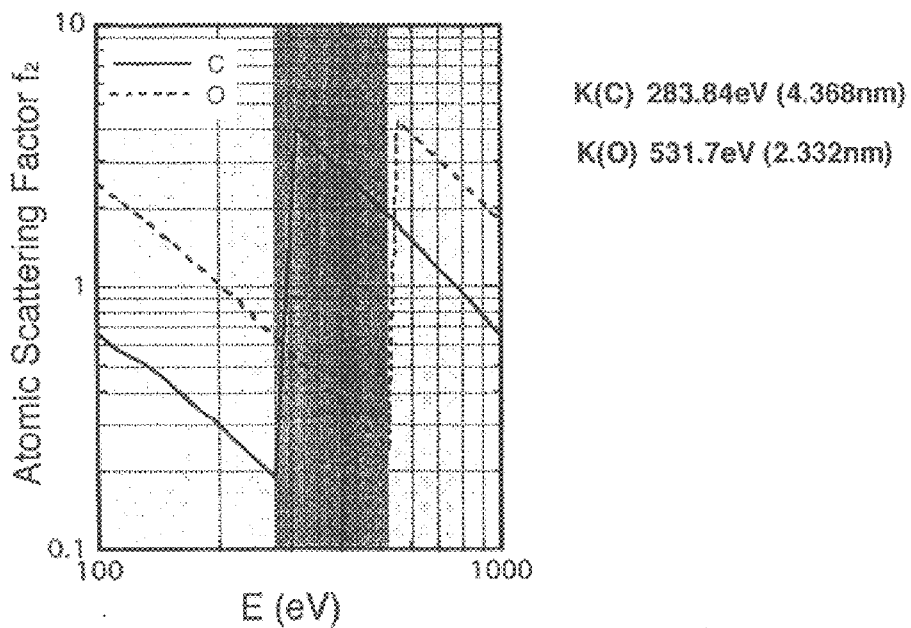
FIG. 1 is a graph indicating water window zone.
Figure 2:
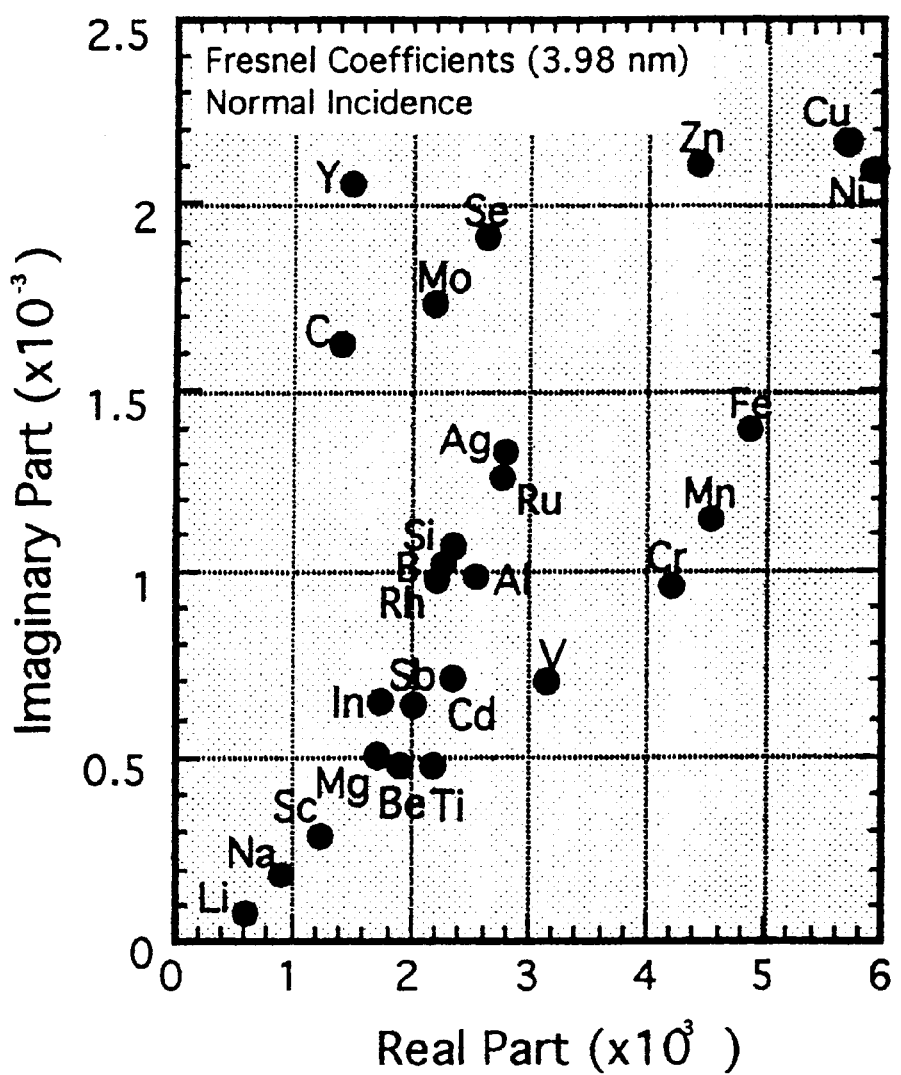
FIG. 2 is a graph indicating Fresnel coefficients in normal incidence at 3.98 nm wavelength.

Embodiments of the multilayer film structure for soft X-ray optical elements according to the present invention will be described in detail hereinbelow in conjunction with the accompanying drawings.

First, FIGS. 3(a) and 3(b) are conceptual views showing the multilayer film structure for soft X-ray optical elements according to the present invention which may be prepared by either a manner wherein a first oxide thin film 1 and a second oxide thin film 2 being a different type of an oxide thin film from that of the first oxide thin film 1 are alternately laminated as shown in FIG. 3(a), or a manner wherein a metal thin film 3 and an oxide thin film 4 are alternately laminated as shown in FIG. 3(b).

In FIG. 4, there are shown examples of types of oxides being capable of forming the above described first oxide thin film 1, the second oxide thin film 2, and the oxide thin film 4.

In the following, examples of a combination of the first oxide thin film 1 and the second oxide thin film as well as examples of a combination of the metal thin film 3 and the oxide thin film 4 will be described by referring to a schema shown in FIG. 5 wherein "groups of elements" are classified into "A1 group to D1 group" in accordance with magnitude of real parts of atomic scattering factors at the wavelength of 3.98 nm., respectively. There is a correlation between the magnitude of atomic scattering factors and Fresnel coefficients in normal incidence (see FIG. 6).

It is herein to be noted that the term "atomic scattering factor" means a factor relating to scattering intensity due to a configuration in the case where an atom is considered to be a structural unit, and it may be also called by the name of "atomic form factor". The atomic scattering factor differs dependent upon wavelengths and has a value inherent in substances, and values of its real part ($f_1$) and imaginary part; ($f_2$) are determined by calculation.

Furthermore, a relationship between atomic scattering factors and Fresnel coefficients in normal incidence is as follows.

Namely, a relationship between refractive indices n, k and atomic scattering factors $f_1$ and $f_2$ is represented by the following equation:

$$n-ik=1-(N_a r_e \lambda^2/2\pi)(f_1+if_2)$$

wherein $N_a$ is a density of the atom, $r_e$ is a classical electron radius, and $\lambda$ is a wavelength of X-ray.

Moreover, a relationship between Fresnel coefficients ($F_r+iF_i$) in normal incidence and indices of refraction is represented as follows.

$$F_r+iF_i=\{1-(n-ik)\}/\{1+(n-ik)\}$$

In FIG. 5, each element involved in A1 group has a value in the real part of an atomic scattering factor of about 10 or less, each element involved in B1 group has a value in the real part of an atomic scattering factor of about 10 to 15 or less, each element involved in C1 group has a value in the real part of an atomic scattering factor of about 15 to 20 or less, and each element involved in D1 group has a value in the real part of an atomic scattering factor of about 20 or more, respectively.

Furthermore, each of all the elements selected in the "A1 group to D1 group" has a value of the imaginary part of an atomic scattering factor of about 10 or less.

Figure 6:
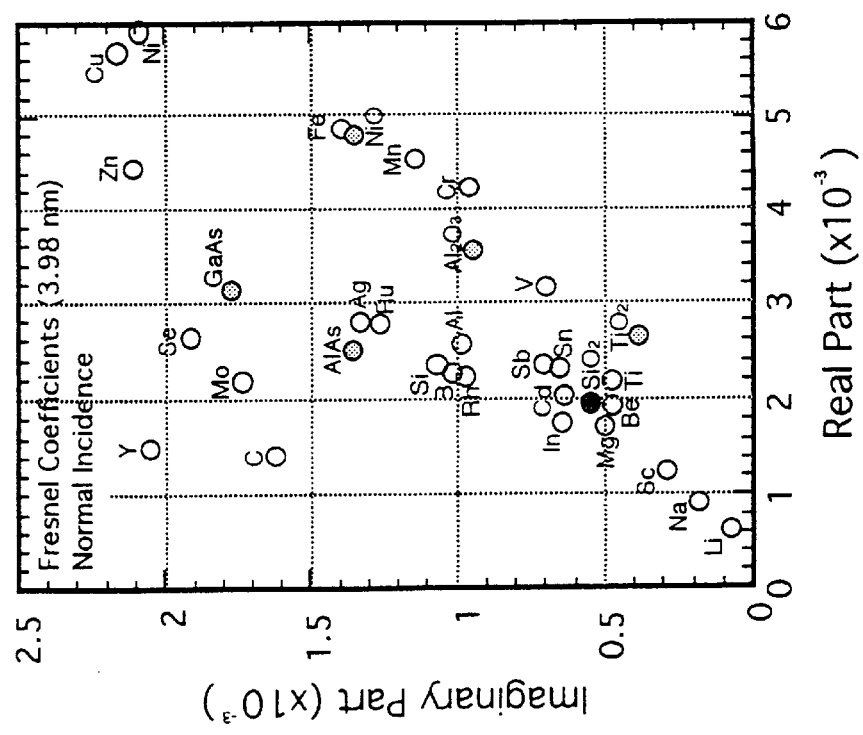
FIG. 6 is a graph indicating Fresnel coefficients in normal incidence at 3.98 nm wavelength with respect to metals and oxides.

Moreover, the "A2 group to D2 group" in the "groups of oxides" have same tendency as that of the above described "groups of elements" as is apparent from FIG. 6.

In the case where a multilayer film structure is formed from the first oxide thin film 1 and the second oxide thin film 2, one each oxide is selected from two different groups among A2 group, B2 group, C2 group, and D2 group in the groups of oxides of FIG. 5, and the first oxide thin film 1 and the second oxide thin film 2 are prepared from one each of the oxides selected.

For example, when aluminum oxide is selected from B2 group and tin oxide is selected from C2 group, a multilayer structure being effective in water window zone can be formed.

It is to be noted that when a first oxide thin film 1 is selected from titanium oxide, vanadium oxide, cadmium oxide, indium oxide, tin oxide, or antimony oxide, a different oxide from any of the above described first oxide film 1 selected may be selected as a second oxide thin film 2 from the same group as that to which the first oxide in question belongs.

Furthermore, the highest reflectivity is obtained from the case where one each of oxides is selected from A2 group and D2 group. With respect to a combination of A2 group with the other group, the reflectivity lowers in accordance with the following order, i.e., "the case where one each of oxides is selected from A2 group and D2 group→the case where one each of oxides is selected from A2 group and C2 group→the case where one each of oxides is selected from A2 group and B2 group".

On the other hand, when a multilayer film structure is formed from the metal thin film 3 and the oxide thin film 4, the metal thin film 3 is prepared from any one element selected from A1 group, B1 group, C1 group, and D1 group among the groups of elements shown in FIG. 5, while the oxide thin film 4 is prepared from any one element selected from A2 group, B2 group, C2 group, and D2 group among the groups of oxides in the same figure.

The highest reflectivity is obtained in the case where an oxide is selected from A2 group and an element is selected from D1 group, respectively. With respect to a combination of fixed A2 group with the other group, the reflectivity lowers in accordance with the following order, i.e., "the case where an oxide is selected from A2 group and an element is selected from D1 group, respectively,→the case where an oxide is selected from A2 group and an element is selected from C1 group, respectively,→the case where an oxide is selected from A2 group and an element is selected from B1 group, respectively,→the case where an oxide is selected from A2 group and an element is selected from A1 group, respectively".

Moreover, with respect to a combination of fixed D1 group with the other group, the reflectivity lowers in accordance with the following order, i.e., "the case where an oxide is selected from A2 group and an element is selected from D1 group, respectively,→the case where an oxide is selected from B2 group and an element is selected from D1 group, respectively,→the case where an oxide is selected from C2 group and an element is selected from D1 group, respectively,→the case where an oxide is selected from D2 group and an element is selected from D1 group, respectively".

Then, a reflectivity in an example of combination of the first oxide thin film 1 with the second oxide thin film 2 selected on the basis of the schema shown in the above-mentioned FIG. 5 is determined from a calculated value by using an atomic scattering factor.

Figure 7:
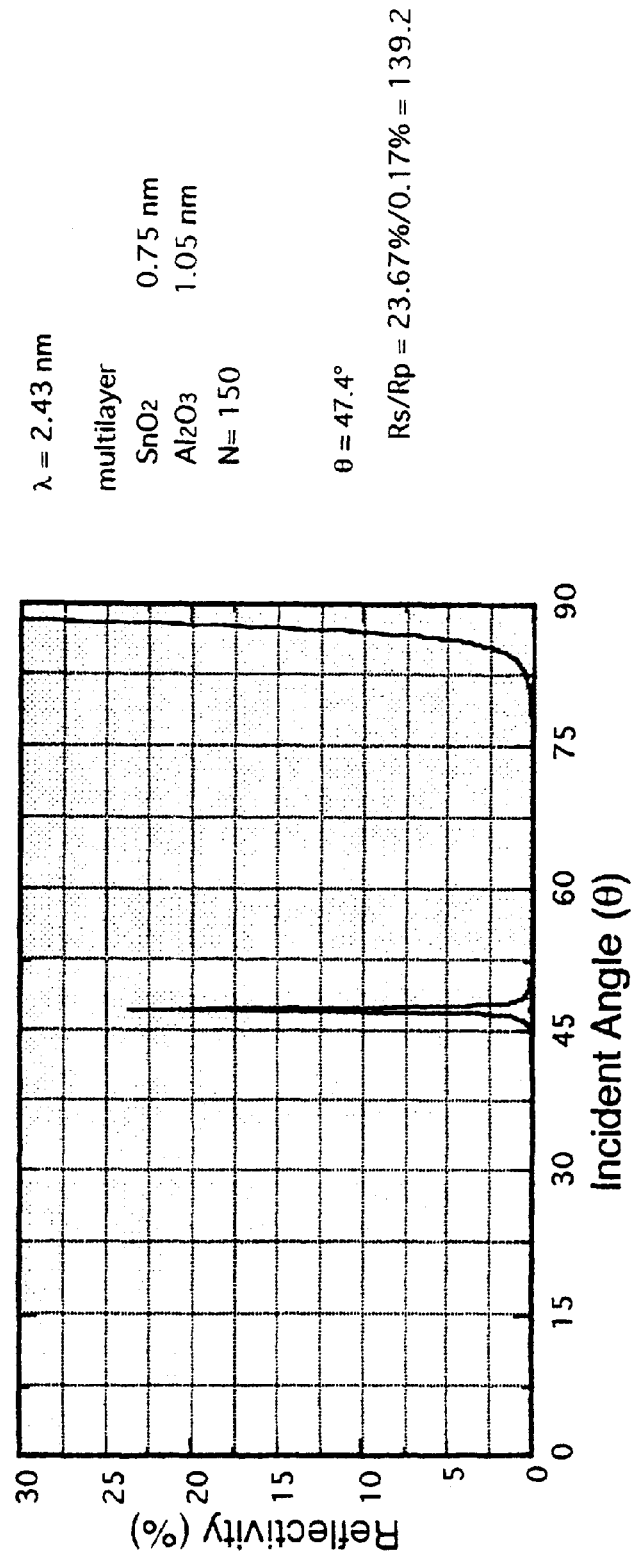
FIG. 7 is a graph indicating a reflectivity in the case where soft X-ray with a "wavelength λ=2.43 nm" is inputted at an "incident angle θ=47.4°" to a multilayer film structure which is obtained by laminating by 150 bi-layers of $SnO_2$ having 0.75 nm thickness and $Al_2O_3$ having 1.05 nm thickness.

FIG. 7 is a graph indicating a reflectivity in the case where soft X-ray with a "wavelength $\lambda=2.43$ nm" is inputted at an "incident angle $\theta=47.4°$" to a multilayer film structure which is obtained by laminating by 150 bi-layers (N=150) of $SnO_2$ having 0.75 nm thickness and $Al_2O_3$ having 1.05 nm thickness. As is seen from the graph of FIG. 7, the reflectivity in s-polarized light (Rs) is 23.67%, and the reflectivity in p-polarized light (Rp) is 0.17%, so that the degree of polarization (Rs/Rp) becomes 139.

Figure 8:
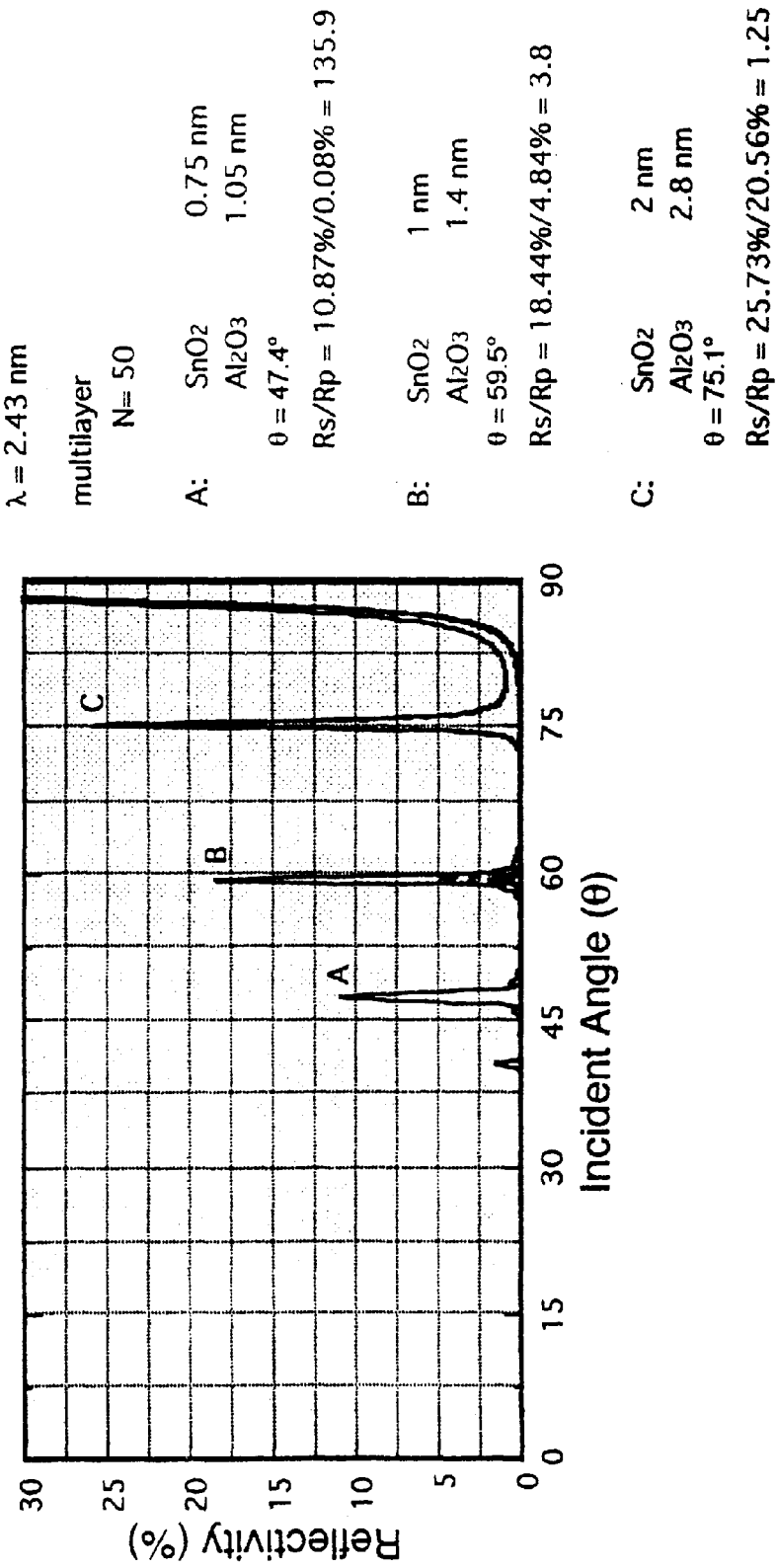
FIG. 8 is a graph indicating reflectivity A in the case where soft X-ray with a "wavelength λ=2.43 nm" is inputted at an "incident angle θ=47.4°" to a multilayer film structure which is obtained by laminating by 50 bi-layers of $SnO_2$ having 0.75 nm thickness and $Al_2O_3$ having 1.05 nm thickness, reflectivity B in the case where soft X-ray with a "wavelength λ=2.43 nm" is inputted at an "incident angle θ=59.5°" to a multilayer film structure which is obtained by laminating by 50 bi-layers of $SnO_2$ having 1 nm thickness and $Al_2O_3$ having 1.4 nm thickness, and reflectivity C in the case where soft X-ray with a "wavelength λ=2.43 nm" is inputted at an "incident angle θ=75.1°" to a multilayer film structure which is obtained by laminating by 50 bi-layers of $SnO_2$ having 2 nm thickness and $Al_2O_3$ having 2.8 nm thickness, respectively.

FIG. 8 is a graph indicating reflectivity A in the case where soft X-ray with a "wavelength $\lambda=2.43$ nm" is inputted at an "incident angle $\theta=47.4°$" to a multilayer film structure which is obtained by laminating by 50 bi-layers of $SnO_2$ having 0.75 nm thickness and $Al_2O_3$ having 1.05 nm thickness, reflectivity B in the case where soft X-ray with a "wavelength $\lambda=2.43$ nm" is inputted at an "incident angle $\theta=59.5°$" to a multilayer film structure which is obtained by laminating by 50 bi-layers of $SnO_2$ having 1 nm thickness and $Al_2O_3$ having 1.4 nm thickness, and reflectivity C in the case where soft X-ray with a "wavelength $\lambda=2.43$ nm" is inputted at an "incident angle $\theta=75.1°$" to a multilayer film structure which is obtained by laminating by 50 bi-layers of $SnO_2$ having 2 nm thickness and $Al_2O_3$ having 2.8 nm thickness, respectively.

As is seen from the graph shown in FIG. 8, the reflectivity in s-polarized light (Rs) is 10.87%, and the reflectivity in p-polarized light (Rp) is 0.08% with respect to the reflectivity A, respectively, so that the degree of polarization (Rs/Rp) becomes 135.9, the reflectivity in s-polarized light (Rs) is 18.44%, and the reflectivity in p-polarized light (Rp) is 4.84% with respect to the reflectivity B, respectively, so that the degree of polarization (Rs/Rp) becomes 3.8, and the reflectivity in s-polarized light (Rs) is 25.73%, and the reflectivity in p-polarized light (Rp) is 20.56% with respect to the reflectivity C, respectively, so that the degree of polarization (Rs/Rp) becomes 1.25.

Figure 9:
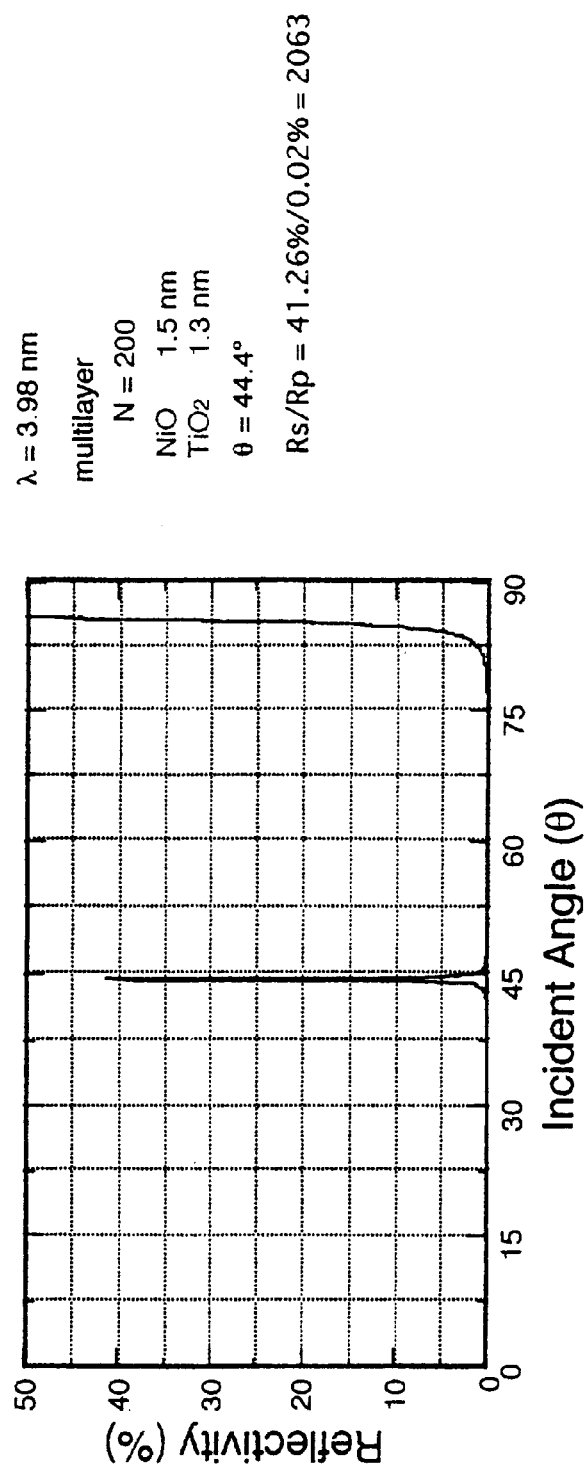
FIG. 9 is a graph indicating reflectivity in the case where soft X-ray with a "wavelength λ=3.98 nm" is inputted at an "incident angle θ=44.4°" to a multilayer film structure which is obtained by laminating by 200 bi-layers of NiO having 1.5 nm thickness and $TiO_2$ having 1.3 nm thickness.

FIG. 9 is a graph indicating reflectivity in the case where soft X-ray with a "wavelength $\lambda=3.98$ nm" is inputted at an "incident angle $\theta=44.4°$" to a multilayer film structure which is obtained by laminating by 200 bi-layers of NiO having 1.5 nm thickness and $TiO_2$ having 1.3 nm thickness. As is seen from the graph shown in FIG. 9, the reflectivity in s-polarized light (Rs) is 41.26%, and the reflectivity in p-polarized light (Rp) is 0.02%, so that the degree of polarization (Rs/Rp) becomes 2063.

Figure 10:
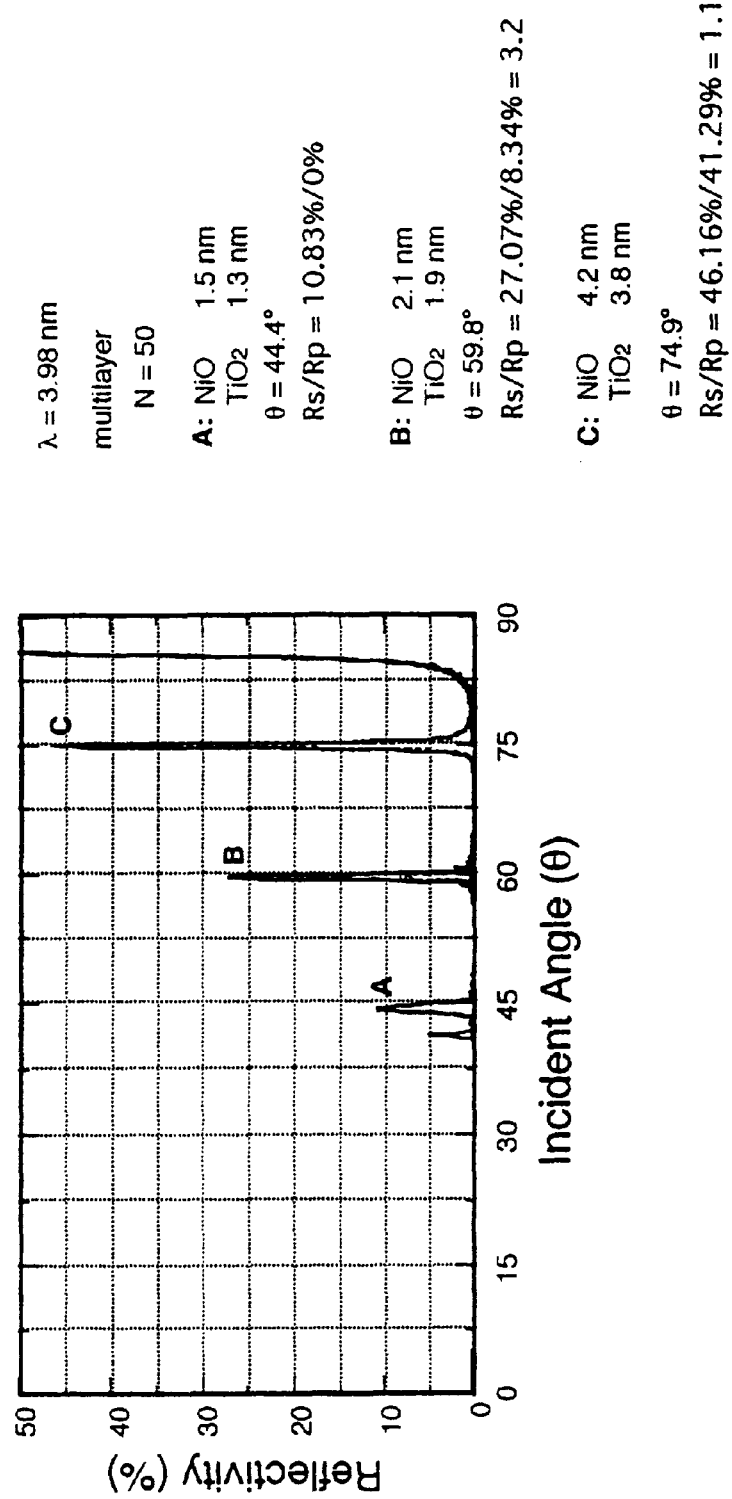
FIG. 10 is a graph indicating reflectivity A in the case where soft X-ray with a "wavelength λ=3.98 nm" is inputted at an "incident angle θ=44.4°" to a multilayer film structure which is obtained by laminating by 50 bi-layers of NiO having 1.5 nm thickness and $TiO_2$ having 1.3 nm thickness, reflectivity B in the case where soft X-ray with a "wavelength λ=2.43 nm" is inputted at an "incident angle θ=59.8°" to a multilayer film structure which is obtained by laminating by 50 bi-layers of NiO having 2.1 nm thickness and $TiO_2$ having 1.9 nm thickness, and reflectivity C in the case where soft X-ray with a "wavelength λ=2.43 nm" is inputted at an "incident angle θ=74.9°" to a multilayer film structure which is obtained by laminating by 50 bi-layers of NiO having 4.2 nm thickness and $TiO_2$ having 3.8 nm thickness, respectively.

FIG. 10 is a graph indicating reflectivity A in the case where soft X-ray with a "wavelength $\lambda=3.98$ nm" is inputted at an "incident angle $\theta=44.4°$" to a multilayer film structure which is obtained by laminating by 50 bi-layers of NiO having 1.5 nm thickness and $TiO_2$ having 1.3 nm thickness, reflectivity B in the case where soft X-ray with a "wavelength $\lambda=2.43$ nm" is inputted at an "incident angle $\theta=59.8°$" to a multilayer film structure which is obtained by laminating by 50 bi-layers of NiO having 2.1 nm thickness and $TiO_2$ having 1.9 nm thickness, and reflectivity C in the case where soft X-ray with a "wavelength $\lambda=2.43$ nm" is inputted at an "incident angle $\theta=74.9°$" to a multilayer film structure which is obtained by laminating by 50 bi-layers of NiO having 4.2 nm thickness and $TiO_2$ having 3.8 nm thickness, respectively.

As is seen from the graph shown in FIG. 10, the reflectivity in s-polarized light (Rs) is 10.83%, and the reflectivity in p-polarized light (Rp) is 0% with respect to the reflectivity A, respectively, the reflectivity in s-polarized light (Rs) is 27.07%, and the reflectivity in p-polarized light (Rp) is 8.34% with respect to the reflectivity B, respectively, so that the degree of polarization (Rs/Rp) becomes 3.2, and the reflectivity in s-polarized light (Rs) is 46.16%, and the reflectivity in p-polarized light (Rp) is 41.29% with respect to the reflectivity C, respectively, so that the degree of polarization (Rs/Rp) becomes 1.1.

As indicated in the examples described above, a high reflectivity can be attained in soft X-ray region in accordance with the present invention.

As a method for forming the oxide thin films as well as the metal thin films according to the present invention, well-known electron-beam deposition, magnetron-spattering, ion-beam spattering, CVD (Chemical Vapor Deposition), MBE (Molecular-beam Epitaxy) or the like method can suitably be applied.

Furthermore, the manufacturing system as well as the manufacturing method which will be described hereinbelow may be employed to form the oxide thin films and the metal thin films according to the present invention. It is to be noted that thin films other than the oxide thin films and the metal thin films can also be manufactured by this manufacturing system as well as this manufacturing method, so that the explanation which will be followed is not limited to only the manufacturing of oxide thin films and metal thin films.

Figure 11:
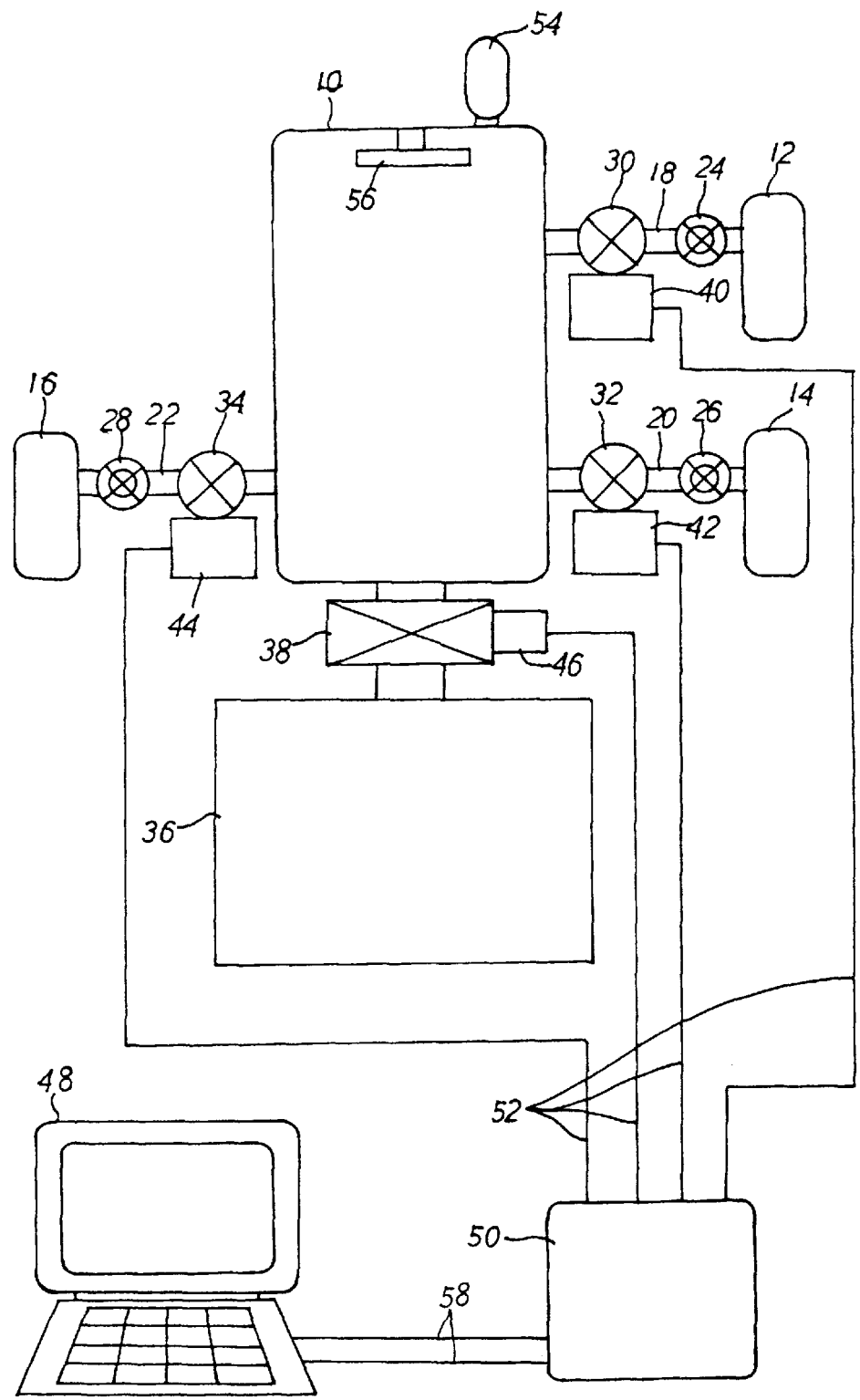
FIG. 11 is an explanatory view, in a schematic constitution, showing the manufacturing system for thin films according to an embodiment of the present invention.

Namely, FIG. 11 shows an example of a manufacturing system for thin films which includes a vacuum container 10 the interior of which is maintained at a vacuum condition, a first container 12 for containing a first metallic compound vapor or non-metallic compound vapor, a second container 14 for containing a second metallic compound vapor or non-metallic compound vapor being different from the metallic compound vapor or non-metallic compound vapor contained in the first container 12, and a third container 16 for containing the vapor of an oxidizing agent, a halogenating agent, a sulfidizing agent, a seleniding agent, a telluriding agent, or a nitriding agent.

The first container 12, the second container 14, and the third container 16 as well as the vacuum container 10 are connected in a manner capable of communicating one another through vapor supply pipes 18, 20, and 22 each being made of stainless steel.

Furthermore, these vacuum supply pipes 18, 20, and 22 are provided with flow control valves 24, 26, and 28 as well as electromagnetic valves 30, 32, and 34, respectively.

On one hand, to the vacuum container 10 is connected a vacuum pump 36 through a gate valve 38.

Moreover, the electromagnetic valves 30, 32, and 34 as well as the gate valve 38 are provided with actuators 40, 42, 44, and 46, respectively, wherein these actuators 40, 42, 44, and 46 are connected through respective connecting cables 52 with a driving unit 50 for the electromagnetic valves 30, 32, and 34 as well as the gate valve 38 which are controlled by means of a computer 48 for opening and closing the same, whereby the electromagnetic valves 30, 32, and 34 as well as the gate valve 38 are opened and closed at a prescribed timing instructed by the computer 48, respectively.

Furthermore, reference numeral 54 designates a vacuum gage, 56 a holder for a material body on which a thin film is to be formed, and 58 a connecting cables for connecting the computer 48 with the driving unit 50, respectively.

In the case when a multilayer film composed of a compound thin film such as an oxide thin film, a halide thin film, a sulfide thin film, selenide thin film, telluride thin film, a nitride thin film or the like thin film of a metallic or non-metallic material is formed on the surface of a material body by means of the system for manufacturing thin films constituted as described above, first, a material body on which thin films, which constitute the multilayer film, are to be formed is set in the vacuum container 10, and in this case the aforesaid material body may be held in the holder 56, or the material body may be merely rest in the vacuum container 10 in accordance with a shape of the material body.

Then, the gate valve 38 is opened, and the pressure in the vacuum container 10 is reduced to $10^{-3}$ Pa or less by means of the vacuum pump 36. A pressure in the vacuum container 10 is measured by the vacuum gage 54.

Figure 12:
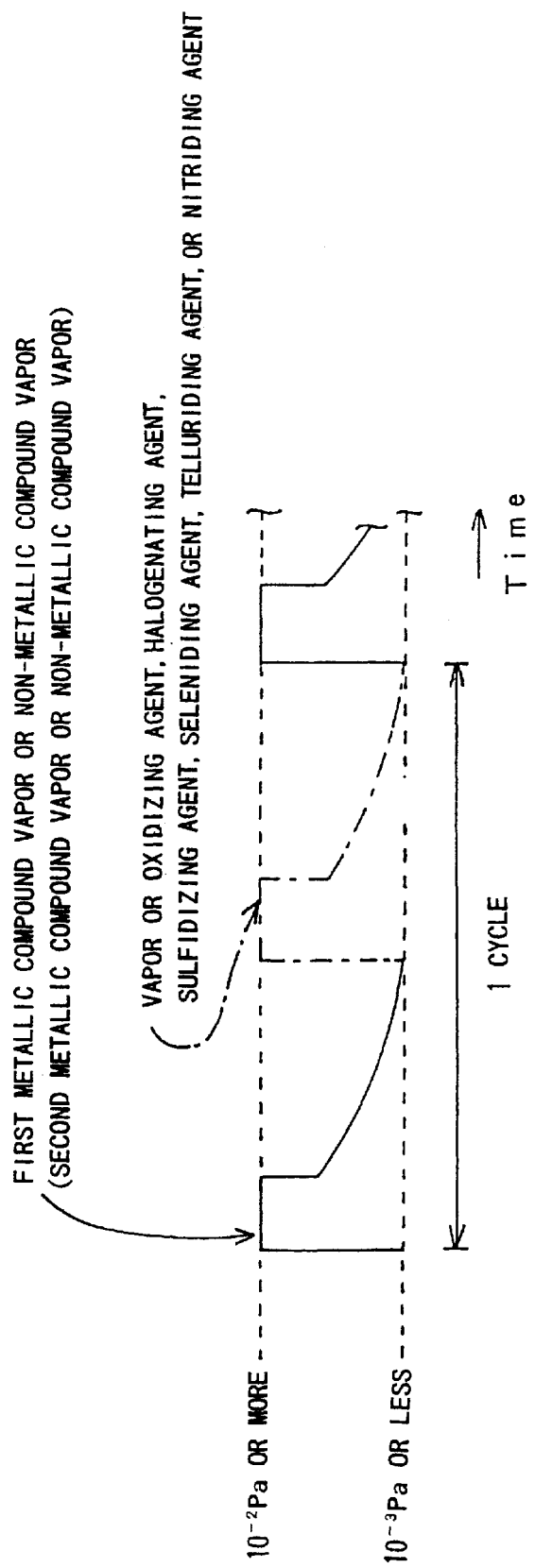
FIG. 12 is a timing chart indicating each of one cycles in the first and the second steps.

Thereafter, a first thin film and a second thin film are prepared as the thin films for constituting a multilayer film. In the following, operations for preparing the first thin film and the second thin film will be described by referring to FIGS. 11 and 12, besides operations for forming a multilayer film by building up the first thin film and the second thin film in layers will be also described.

[Operation for preparing first thin film: the first step]

First, the electromagnetic valve 30 is opened, whereby a first metallic compound vapor or a non-metallic compound vapor contained in the first container 12 is introduced into the vacuum container 10 until a pressure in the vacuum container 10 reaches $10^{-2}$ Pa or more, and the electromagnetic valve 30 is held in an opened state for a predetermined period of time. As a result, molecules of the first metallic compound vapor or non-metallic compound vapor are adsorbed by the surface of a material body.

Then, after closing the electromagnetic valve 30, the first metallic compound vapor or non-metallic compound vapor is exhausted from the vacuum container 10 by means of the vacuum pump 36 until a pressure in the vacuum container 10 reaches $10^{-3}$ Pa or less.

When a pressure in the vacuum container 10 reaches $10^{-3}$ Pa or less, the electromagnetic valve 34 is opened, whereby vapor of an oxidizing agent, a halogenating agent, a sulfidizing agent, a seleniding agent, a telluriding agent, or a nitriding agent contained in the third container 16 is introduced into the vacuum container 10 until a pressure in the vacuum container 10 reaches $10^{-2}$ Pa or more, and the electromagnetic valve 34 is held in an opened state for a predetermined period of time. As a consequence, molecules in vapor of the oxidizing agent, the halogenating agent, the sulfidizing agent, the seleniding agent, the telluriding agent, or the nitriding agent are adsorbed on the surface of the material body.

In this case, since molecules of the first metallic compound vapor or non-metallic compound vapor have already been adsorbed on the surface of the material body, further adsorption of molecules in vapor of the oxidizing agent, the halogenating agent, the sulfidizing agent, the seleniding agent, the telluriding agent, or the nitriding agent to the surface of the material body result in a chemical reaction on the surface thereof to form a metallic or non-metallic compound thin film such as an oxide thin film, a halide thin film, a sulfide thin film, a selenide thin film, a telluride thin film, a nitride thin film, or the like thin film (a first thin film).

Then, after closing the electromagnetic valve 34, vapor of the oxidizing agent, the halogenating agent, the sulfidizing agent, the seleniding agent, the telluriding agent, or the nitriding agent is exhausted from the vacuum container 10 by the vacuum pump 36 until a pressure in the vacuum container 10 reaches $10^{-3}$ Pa or less.

As described above, one cycle of the first step being the process for preparing the first thin film is completed, and the above described first step is repeated over a plural number of cycles in response to a required film thickness of the first thin film.

When an amount of introduction of vapor of the first metallic compound or vapor of the first non-metallic compound as well as an amount of introduction of vapor of an oxidizing agent, a halogenating agent, a sulfidizing agent, a seleniding agent, a telluriding agent, or a nitriding agent into the vacuum container 10 are simply controlled, and more specifically, when either each amount of introduction of the first metallic or non-metallic compound vapor and of the oxidizing agent, the halogenating agent, the sulfidizing agent, the seleniding agent, the telluriding agent, or the nitriding agent vapor, which are to be alternately introduced in one cycle, is suitably selected, or the number of cycles is suitably selected, a desired film thickness of the first thin film formed as described above can be controlled with a precision of atom-dimensional size.

Furthermore, when a period of time for introducing the first metallic or non-metallic compound vapor as well as a period of time for introducing the oxidizing agent, the halogenating agent, the sulfidizing agent, the seleniding agent, the telluriding agent, or the nitriding agent vapor in each cycle is controlled, molecules of the first metallic or non-metallic compound vapor as well as the oxidizing agent, the halogenating agent, the sulfidizing agent, the seleniding agent, the telluriding agent, or the nitriding agent vapor may be allowed to enter even a very minute gap, so that the first thin film can be formed on a material body having any profile, i.e., even on a material having a curved profile or the like with a precision of atom-dimensional size under the control of a desired film thickness.

Moreover, as described in detail hereinbelow, when a material body is heat-treated at a suitable temperature during the reaction, a self-stopping function in adsorption of molecules of the oxidizing agent, the halogenating agent, the sulfidizing agent, the seleniding agent, the telluriding agent, or the nitriding agent vapor as well as molecules of the first metallic or non-metallic compound vapor can be allowed to appear, so that the film thickness to be formed on a material body can automatically be controlled with a precision of atom-dimensional size.

It is to be noted that when only the first thin film is formed on the surface of a material body by conducting merely the above described first step, a single layer thin film is formed on the surface of the material body.

[Operation for preparing second thin film: the second step]

In the following, the production of a second thin film to be deposited on the surface of the first thin film which has been prepared as described above will be explained.

When a pressure in the vacuum container 10 becomes $10^{-3}$ Pa or less, the electromagnetic valve 32 is opened, whereby a second metallic compound vapor or a non-metallic compound vapor contained in the second container 14 is introduced into the vacuum container 10 until a pressure in the vacuum container 10 reaches $10^{-2}$ Pa or more, and the electromagnetic valve 32 is held in an opened state for a predetermined period of time. As a result, molecules of the second metallic compound vapor or non-metallic compound vapor are adsorbed by the surface of a material body.

Then, after closing the electromagnetic valve 32, the second metallic compound vapor or non-metallic compound vapor is exhausted from the vacuum container 10 by means of the vacuum pump 36 until a pressure in the vacuum container 10 reaches $10^{-3}$ Pa or less.

When a pressure in the vacuum container 10 reaches $10^{-3}$ Pa or less, the electromagnetic valve 34 is opened, whereby vapor of an oxidizing agent, a halogenating agent, a sulfidizing agent, a seleniding agent, a telluriding agent, or a nitriding agent contained in the third container 16 is introduced into the vacuum container 10 until a pressure in the vacuum container 10 reaches $10^{-2}$ Pa or more, and the electromagnetic valve 34 is held in an opened state for a predetermined period of time. As a consequence, molecules in vapor of the oxidizing agent, the halogenating agent, the sulfidizing agent, the seleniding agent, the telluriding agent, or the nitriding agent are adsorbed on the surface of the material body.

In this case, since molecules of the second metallic compound vapor or non-metallic compound vapor have already been adsorbed on the surface of the material body, further adsorption of molecules in vapor of the oxidizing agent, the halogenating agent, the sulfidizing agent, the seleniding agent, the telluriding agent, or the nitriding agent to the surface of the material body result in a chemical reaction on the surface thereof to form a second metallic or non-metallic compound thin film such as an oxide thin film, a halide thin film, a sulfide thin film, a selenide thin film, a telluride thin film, a nitride thin film, or the like thin film (a second thin film) being a different type of the first thin film (the first metallic or non-metallic compound thin film such as the oxide thin film, the halide thin film, the sulfide thin film, the selenide thin film, the telluride thin film, the nitride thin film, or the like thin film).

Then, after closing the electromagnetic valve 34, vapor of the oxidizing agent, the halogenating agent, the sulfidizing agent, the seleniding agent, the telluriding agent, or the nitriding agent is exhausted from the vacuum container 10 by the vacuum pump 36 until a pressure in the vacuum container 10 reaches $10^{-3}$ Pa or less.

As described above, one cycle of the second step being the process for preparing second thin film is completed, and the above described second step is repeated over a plural number of cycles in response to a required film thickness of the second thin film.

When an amount of introduction of vapor of the second metallic compound or vapor of the second non-metallic compound as well as an amount of introduction of vapor of the oxidizing agent, the halogenating agent, the sulfidizing agent, the seleniding agent, the telluriding agent, or the nitriding agent into the vacuum container 10 are simply controlled, and more specifically, when either each amount of introduction of the second metallic or non-metallic compound vapor and of the oxidizing agent, the halogenating agent, the sulfidizing agent, the seleniding agent, the telluriding agent, or the nitriding agent vapor, which are to be alternately introduced in one cycle, is suitably selected, or the number of cycles is suitably selected, a desired film thickness of the second thin film to be formed as described above can be controlled with a precision of atom-dimensional size.

Furthermore, when a period of time for introducing the second metallic or non-metallic compound vapor as well as a period of time for introducing the oxidizing agent, the halogenating agent, the sulfidizing agent, the seleniding agent, the telluriding agent, or the nitriding agent vapor in each cycle is controlled, molecules of the second metallic or non-metallic compound vapor as well as the oxidizing agent, the halogenating agent, the sulfidizing agent, the seleniding agent, the telluriding agent, or the nitriding agent vapor may be allowed to enter even a very minute gap, so that the second thin film can be formed on a material body having any profile, i.e., even on a material having a curved profile or the like with a precision of atom-dimensional size under the control of a desired film thickness.

Moreover, as described in detail hereinbelow, when a material body is heat-treated at a suitable temperature during the reaction, a self-stopping function in adsorption of molecules of the oxidizing agent, the halogenating agent, the sulfidizing agent, the seleniding agent, the telluriding agent, or the nitriding agent vapor as well as molecules of the second metallic or non-metallic compound vapor can be allowed to appear, so that a film thickness of the second thin film to be formed on a material body can automatically be controlled with a precision of atom-dimensional size.

[Alternate deposition of the first thin film and the second thin film]

Operations for depositing alternately the first thin film and the second thin film prepared as described above will be described hereinbelow.

When the above described first step for the operations of preparing the first thin film and the above described second step for the operations of preparing the second thin film are alternately repeated, each of metallic or non-metallic compound thin films such as oxide thin films, halide thin films, sulfide thin films, selenide thin films, telluride thin films, nitride thin films, or the like thin films having different refractive indices from one another can alternately be deposited, whereby a multilayer film for optical elements in which a high reflectivity can be attained at a desired wavelength is obtained. Besides, since a film thickness of the multilayer film can be formed under the control of a level of atom-dimensional size, the multilayer film capable of being used for multilayer film optical elements for soft X-ray can be prepared.

In the following, experimental examples will be described.

[Preparation of aluminum oxide thin film and self-stopping function of aluminum oxide thin film]

First, the preparation of an aluminum oxide thin film composed of the first thin film of a multilayer film capable of being used for optical elements for soft X-ray as a first metallic or non-metallic compound thin film such as an oxide thin film, a halide thin film, a sulfide thin film, a selenide thin film, a telluride thin film, a nitride thin film, or the like thin film as well as a self-stopping function of the aluminum oxide thin film will be described.

A (100)-oriented silicon substrate (substrate as a material body on which is to be formed a thin film) which had been dried with the use of dry nitrogen was set into a cylindrical container (vacuum container 10) made of SUS316 and having 200 mm diameter and 300 mm length which had been washed by such a manner that the cylindrical container was subjected to ultrasonic cleaning with an organic solvent, and with pure water in this order, besides it was dipped in 4.7% by weight of hydrofluoric acid for 15 seconds, and was washed off with super pure water, and the aluminum oxide thin film composed of the first thin film of the multilayer film was formed by employing the vacuum pump 36 of 200 liter/sec.

First, the interior of the vacuum container 10 is evacuated up to "$1.3\times10^{-4}$ Pa", thereafter trimethylaluminum (TMA) vapor is introduced into the vacuum container 10 from the first container 12 for 1 second to raise the pressure in the vacuum container 10 to "$1.3\times10^{-2}$ Pa", and then, the vacuum container 10 is exhausted by means of the vacuum pump 36 for 2 seconds to reduce the pressure in the vacuum container 10 up to "$1.3\times10^{-4}$ Pa".

Furthermore, aqueous hydrogen peroxide vapor is introduced into the vacuum container 10 from the third container 16 for 1 second to raise the pressure in the vacuum container 10 to "$1.3\times10^{-2}$ Pa", and then the vacuum container 10 is evacuated for 2 seconds by means of the vacuum pump 36 to reduce the pressure in the vacuum container 10 up to "$1.3\times10^{-4}$ Pa".

As a result of repeating the above described cycle, it has been found from the analysis by means of an in-situ ellipsometer that 150 cycles of aluminum oxide thin films were formed during a period of 15 minutes.

Figure 13:
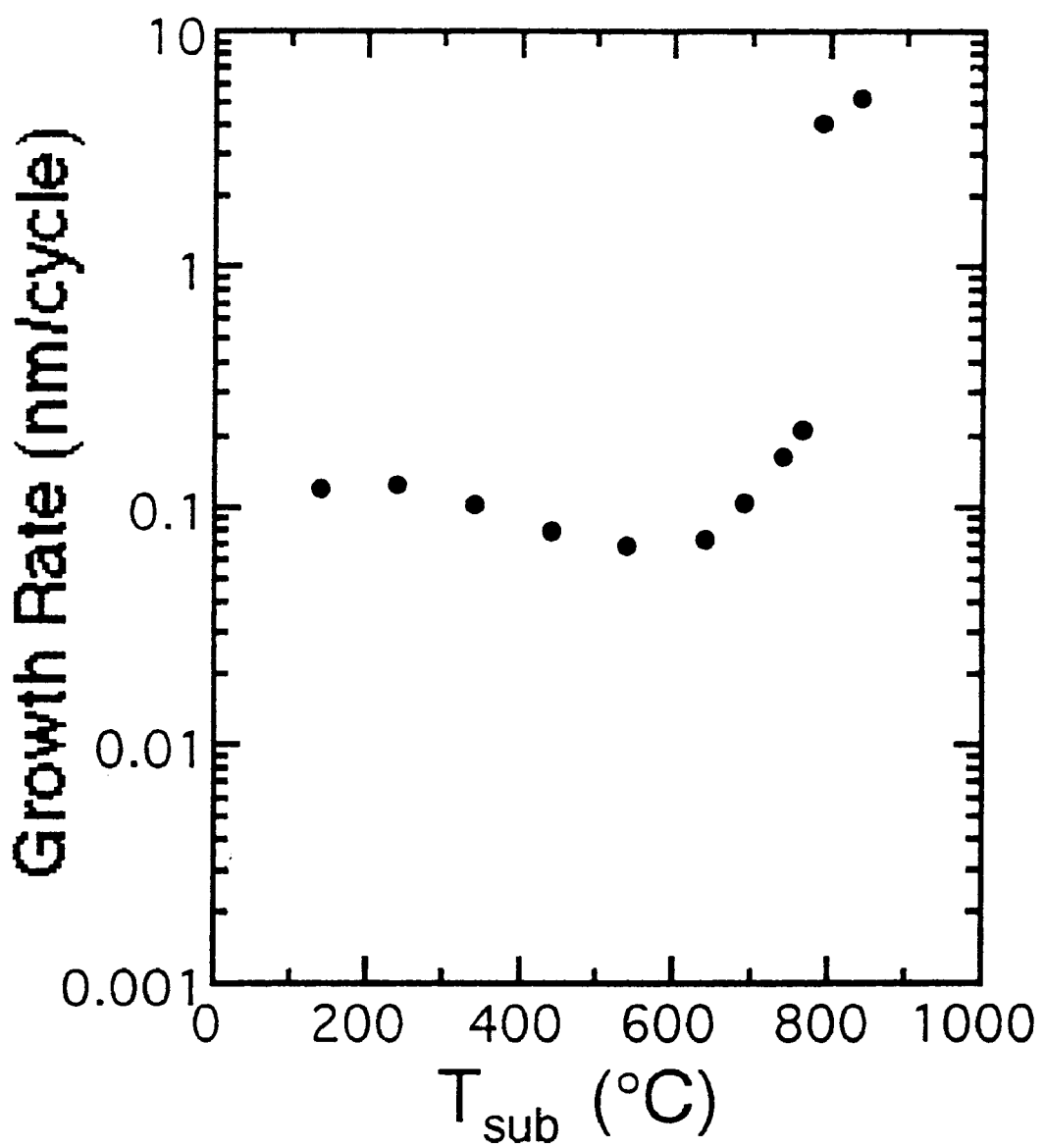
FIG. 13 is a graph indicating a dependency of substrate temperature with respect to the growth rate of an aluminum oxide thin film.

FIG. 13 indicates a dependency of substrate temperature with respect to the growth rate of an aluminum oxide thin film wherein the substrate was heated to a predetermined temperature by means of an infrared heater. As shown in FIG. 13, it has been found that the growth rate is substantially constant, i.e., 0.1 nm/cycle over a range wherein a substrate temperature ($T_{sub}$) extends from room temperature to 750° C. This, i.e., the fact to the effect that the growth rate is substantially constant means there is a self-stopping function during an adsorption process of a raw material with respect to a wide range of the substrate temperatures, and in other words, the growth rate is not dominated by thermal decomposition on the surface of the substrate.

Figure 14:
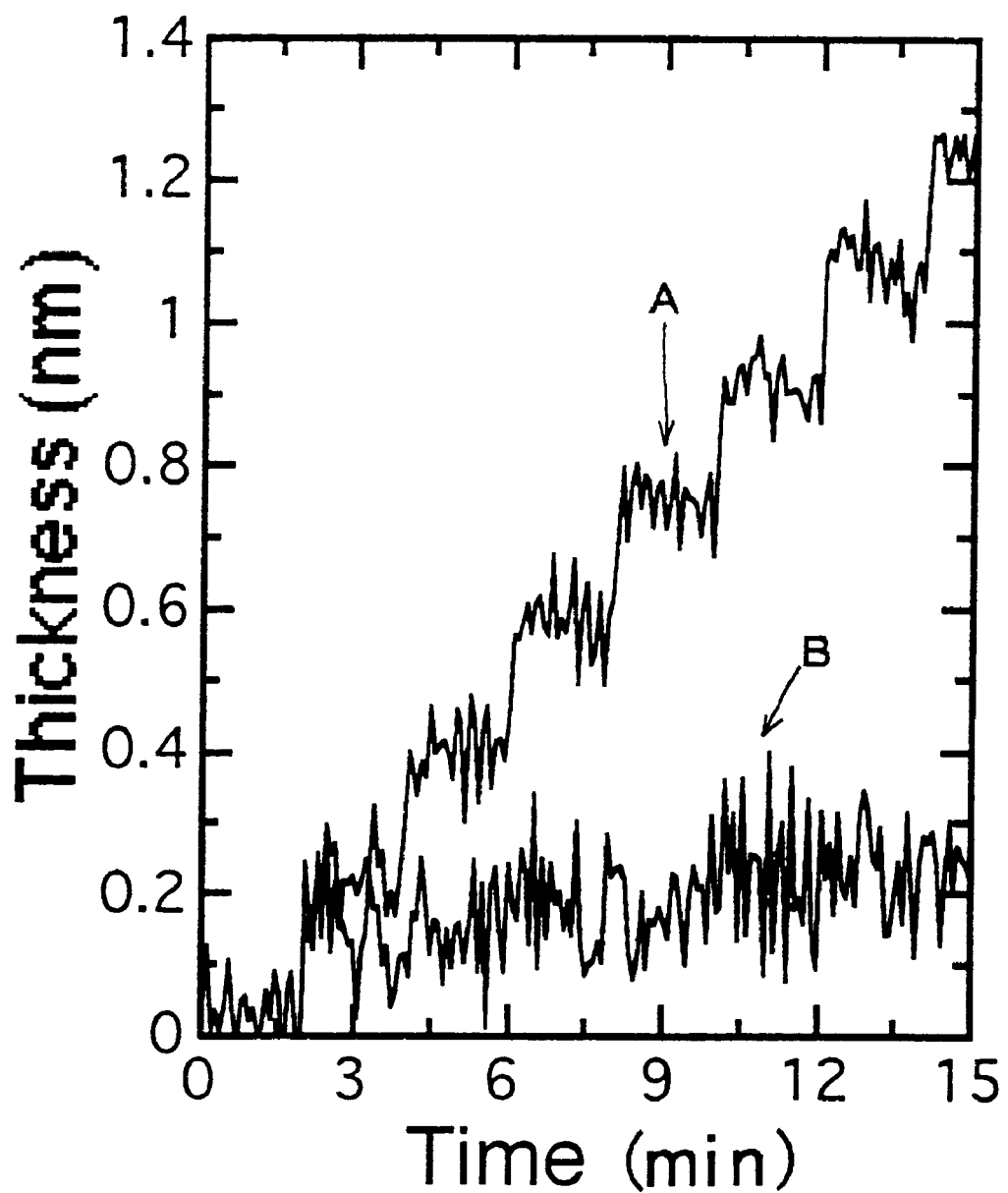
FIG. 14 is a graph indicating variations A in a film thickness in the case where introduction of TMA vapor commences 2 minutes after the start of the observation, and then the TMA vapor and aqueous hydrogen peroxide vapor are alternately introduced in every 1 minute for 20 seconds each, and variations B in a film thickness in the case where only TMA vapor is introduced in every 2 minutes for 20 seconds each, respectively.
Figure 15:
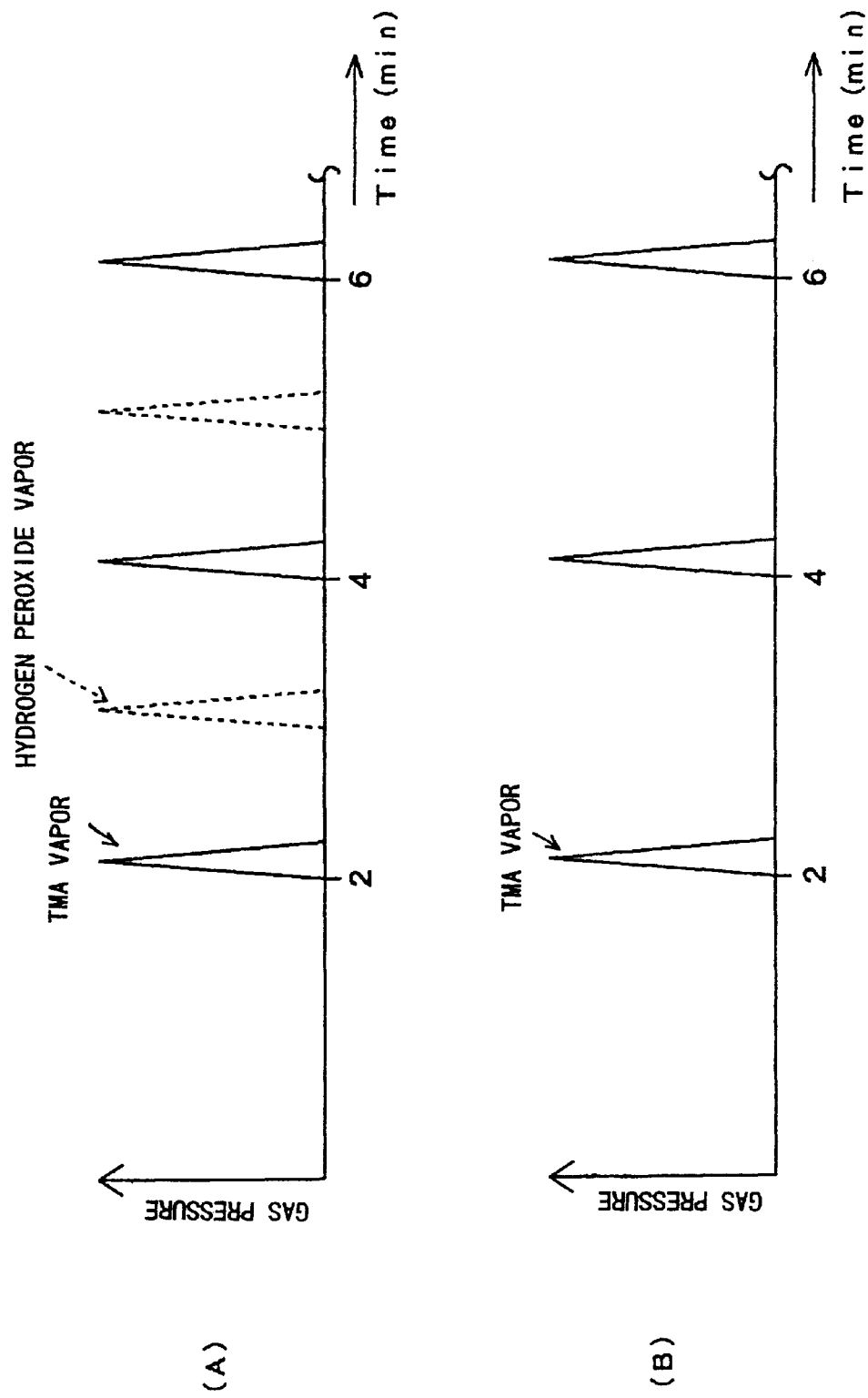
FIG. 15(A) is a timing chart indicating the timing for introducing the TMA vapor and the hydrogen peroxide vapor in the variations A in FIG. 14, respectively.
FIG. 15(B) is a timing chart indicating the timing for introducing the TMA vapor in the variations B of FIG. 14.

Furthermore, FIG. 14 indicates both results of variations A in a film thickness and variations B in a film thickness as a result of the observation by the use of an in-situ ellipsometer wherein the variations A were obtained from the case where introduction of TMA vapor commences 2 minutes after the start of the observation, and then the TMA vapor and aqueous hydrogen peroxide vapor are alternately introduced in every 1 minute for 20 seconds each (see FIG. 15(A)), and the variations B were obtained from the case where only TMA vapor is introduced in every 2 minutes for 20 seconds each (see FIG. 15(B)), respectively.

As shown in FIG. 14, remarkable jumps in film thickness are observed in the variations A at the time of introducing the TMA vapor, while the thickness of a thin film is substantially constant in the variations B.

Namely, the above described fact means that TMA can increase the film thickness thereof as a result of chemical combination with aqueous hydrogen peroxide, but deposition of the film is inhibited at the time of operating a self-stopping function as a result of being in effective of the self-stopping function due to the use of TMA alone.

[Preparation of titanium oxide thin film and self-stopping function of titanium oxide thin film]

Next, the preparation of a titanium oxide thin film composed of the second thin film of a multilayer film capable of being used for optical elements for soft X-ray as a second metallic or non-metallic compound thin film such as an oxide thin film, a halide thin film, a sulfide thin film, a selenide thin film, a telluride thin film, a nitride thin film, or the like thin film as well as a self-stopping function of the titanium oxide thin film will be described.

A (100)-oriented silicon substrate (substrate as a material body on which is to be formed a thin film) which had been dried with the use of dry nitrogen was set into a cylindrical container (vacuum container 10) made of SUS316 and having 200 mm diameter and 300 mm length which had been washed by such a manner that the cylindrical container was subjected to ultrasonic cleaning with an organic solvent, and with pure water in this order, besides it was dipped in 4.7% by weight of hydrofluoric acid for 15 seconds, and was washed off with super pure water, and the titanium oxide thin film composed of the second thin film of the multilayer film was formed by adjusting a temperature of the substrate to 300° C. to 500° C. and employing the vacuum pump 36 of 200 liter/sec.

First, the interior of the vacuum container 10 is evacuated up to "$1.3\times10^{-4}$ Pa", thereafter tetrachlorotitanium vapor is introduced into the vacuum container 10 from the second container 14 for 1 second to raise the pressure in the vacuum container 10 to "$1.3\times10^{-2}$ Pa", and then, the vacuum container 10 is exhausted by means of the vacuum pump 36 for 2 seconds to reduce the pressure in the vacuum container 10 up to "$1.3\times10^{-4}$ Pa".

Furthermore, aqueous hydrogen peroxide vapor is introduced into the vacuum container 10 from the third container 16 for 1 second to raise the pressure in the vacuum container 10 to "$1.3\times10^{-2}$ Pa", and then the vacuum container 10 is evacuated for 2 seconds by means of the vacuum pump 36 to reduce the pressure in the vacuum container 10 up to "$1.3\times10^{-4}$ Pa".

As a result of repeating the above described cycle, it has been found from the analysis by means of an in-situ ellipsometer that 150 cycles of titanium oxide thin films were formed during a period of 15 minutes.

Figure 16:
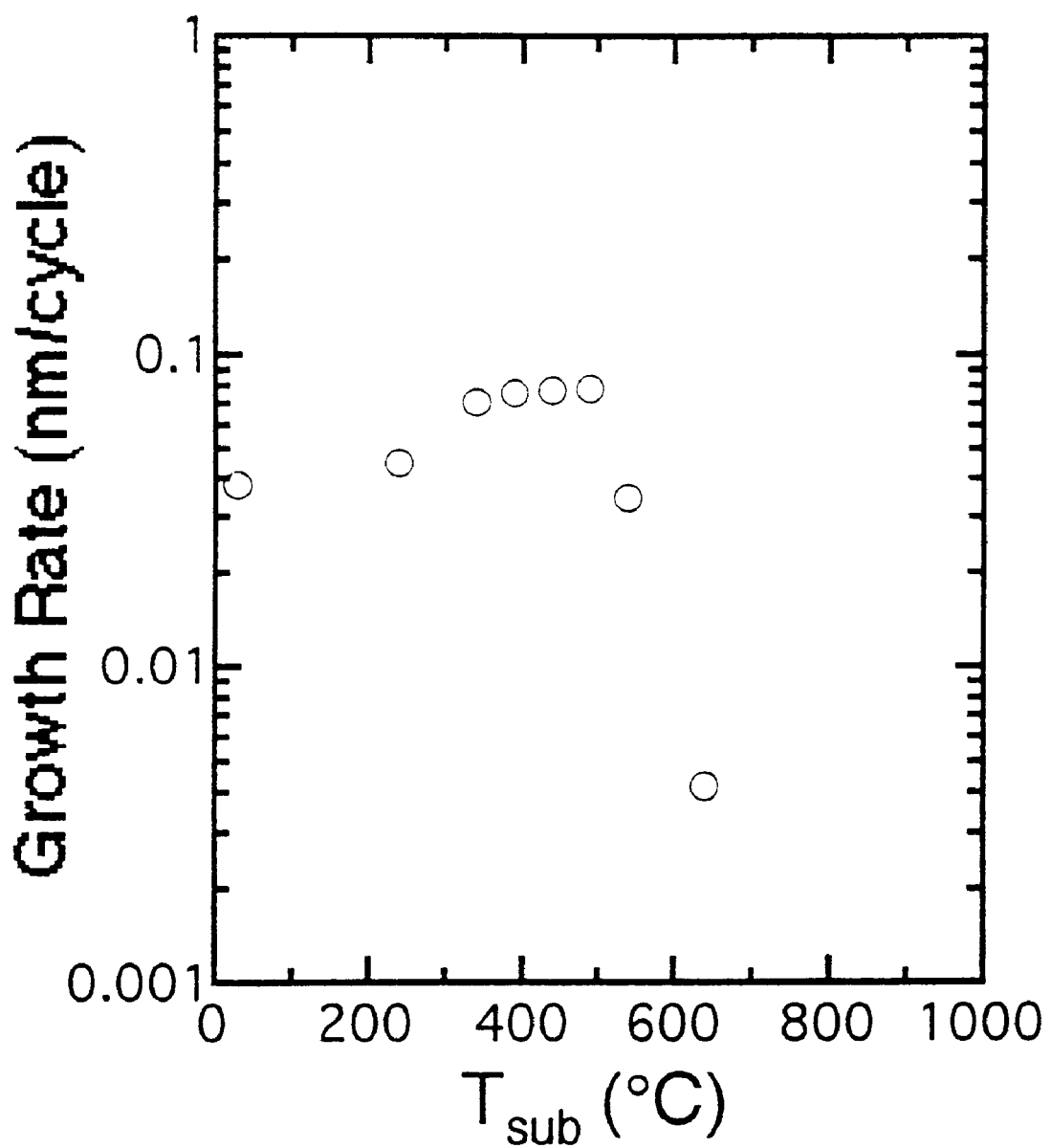
FIG. 16 is a graph indicating a dependency of substrate temperature with respect to the growth rate of a titanium oxide thin film.

FIG. 16 indicates a dependency of substrate temperature with respect to the growth rate of a titanium oxide thin film wherein the substrate was heated to a predetermined temperature by means of an infrared heater. It has been found that the growth rate becomes higher with the elevation of the substrate temperature from room temperature, and is substantially constant, i.e., 0.1 nm/cycle over a range from around 340° C. to 490° C. It is clear that there is a self-stopping function in the adsorption process of a raw material with respect to the substrate temperatures ranging from around 340° C. to 490° C., and in this case the refractive index was 2.2 at 632.8 nm wavelength. Further elevation of the substrate temperature results in rapid reduction in the growth rate. This is because a covering ratio of the adsorption material on the surface of the substrate decreases due to the increase of the substrate temperature.

[Formation of multilayer film by means of self-stopping function]

In the following, a production of a multilayer film by preparing alternately a first thin film and a second thin film by utilizing the above described self-stopping function in adsorption will be described.

A (100)-oriented silicon substrate (substrate as a material body on which is to be formed a thin film) which had been dried with the use of dry nitrogen was set into a cylindrical container (vacuum container 10) made of SUS316 and having 200 mm diameter and 300 mm length which had been washed by such a manner that the cylindrical container was subjected to ultrasonic cleaning with an organic solvent, and with pure water in this order, besides it was dipped in 4.7% by weight of hydrofluoric acid for 15 seconds, and was washed off with super pure water, and the multilayer film for soft X-ray was formed by adjusting a temperature of the substrate to 390° C. and employing the vacuum pump 36 of 200 liter/sec. to thereby superpose alternately an aluminum oxide thin film and a titanium oxide thin film in 300 bi-layers.

First, the interior of the vacuum container 10 is evacuated up to "$1.3\times10^{-4}$ Pa", thereafter trimethylaluminum (TMA) vapor is introduced into the vacuum container 10 from the first container 12 for 1 second to raise the pressure in the vacuum container 10 to "$1.3\times10^{-2}$ Pa", and then, the vacuum container 10 is exhausted by means of the vacuum pump 36 for 2 seconds to reduce the pressure in the vacuum container 10 up to "$1.3\times10^{-4}$ Pa".

Furthermore, aqueous hydrogen peroxide vapor is introduced into the vacuum container 10 from the third container 16 for 1 second to raise the pressure in the vacuum container 10 to "$1.3\times10^{-2}$ Pa", and then the vacuum container 10 is evacuated for 2 seconds by means of the vacuum pump 36 to reduce the pressure in the vacuum container 10 up to "$1.3\times10^{-4}$ Pa".

Then, tetrachlorotitanium vapor is introduced into the vacuum container 10 from the second container 14 for 1 second to raise the pressure in the vacuum container 10 to "$1.3\times10^{-2}$ Pa", and then, the vacuum container 10 is exhausted by means of the vacuum pump 36 for 2 seconds to reduce the pressure in the vacuum container 10 up to "$1.3\times10^{-4}$ Pa".

Furthermore, aqueous hydrogen peroxide vapor is introduced into the vacuum container 10 from the third container 16 for 1 second to raise the pressure in the vacuum container 10 to "$1.3\times10^{-2}$ Pa", and then the vacuum container 10 is evacuated for 2 seconds by means of the vacuum pump 36 to reduce the pressure in the vacuum container 10 up to "$1.3\times10^{-4}$ Pa".

As a result of repeating the above described cycle 300 times being required for 30 minutes, a multilayer film for soft X-ray having 693 angstrom film thickness, 1.90 refractive index, and 2.31 angstrom film thickness per one cycle could be formed.

The compound thin films which can be formed on a material body are not limited to those enumerated above, but other compound thin films, as exemplified in FIG. 17, including 24 types of oxide thin films, 6 types of halide thin films, 1 type of sulfide thin film, 1 type of selenide thin film, 1 type of telluride thin film, 24 types of nitride thin films and the like thin films are also applicable.

Furthermore, FIGS. 18 through 47, inclusive, show examples each of which means an applicable combination between a metallic compound to form a thin film; an oxidizing agent, a halogenating agent, a sulfidizing agent, a seleniding agent, a telluriding agent, or a nitriding agent to form a thin film; and a substrate (a material body on which is to be formed a thin film) in case of forming each compound thin film shown in FIG. 17.

Figure 48:
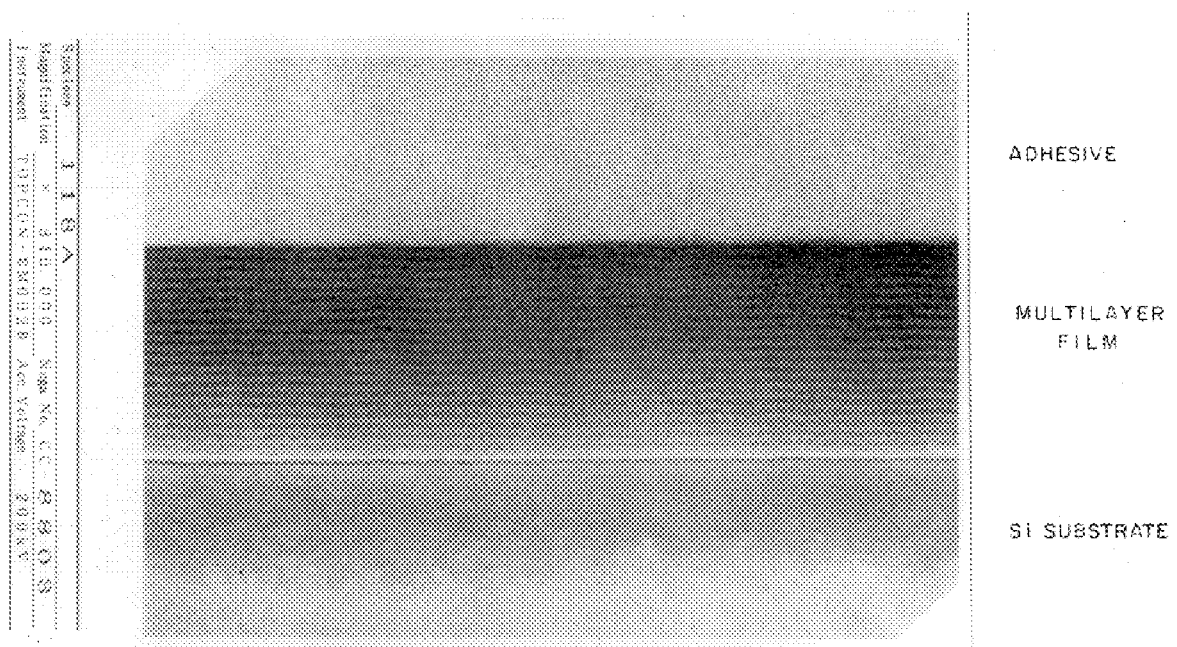
FIG. 48 is a TEM (transmission electron micrograph) of a multilayer film structure, in section, prepared by using the system shown in FIG. 11 in accordance with such a manner that an aluminum oxide thin film having 1.6 nm thickness and a titanium oxide thin film having 1.6 nm thickness are alternately laminated in 20 layers on a Si substrate the temperature of which is made to be 300° C.

FIG. 48 is a TEM (transmission electron micrograph) of a multilayer film structure, in section, prepared by using the system shown in FIG. 11 in accordance with such a manner that an aluminum oxide thin film having 1.6 nm thickness and a titanium oxide thin film having 1.6 nm thickness are alternately laminated in 20 bi-layers on a Si substrate the temperature of which is made to be 300° C. It has been found from FIG. 48 that a film thickness of one set of the layer is about 3.2 nm, and the border lines of the respective layers are clear. In addition, X-ray diffraction characteristics of the specimen shown in FIG. 48 are examined so that no spectrum relating to aluminum oxide and titanium oxide crystals is observed, and crystallization of aluminum oxide and titanium oxide is suppressed. Besides, a reflected peak ($2\theta=2.75°$) of a sharp Cu-k α line ($\lambda=0.154056$ nm) which indicates that the film thickness of one set of layers coincides with 3.2 nm appears. From these results, it has been found that the thin films are deposited in a well-controlled manner.

Since the present invention has been constituted as described above, it provides such an excellent advantage that a multilayer film structure for soft X-ray optical elements in which a high reflectivity can be attained even in a soft X-ray wavelength region of a wavelength of 10 nm or less including the wavelength range of water window zone can be produced.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A multilayer film structure which is highly reflective of soft X-rays, said multilayer film structure comprising:

a plurality of first thin films; and a plurality of second thin films, each second thin film being formed of a different material than is used to form said plurality of first thin films; wherein said plurality of first thin films and said plurality of second thin films are alternately arranged to form said multilayer film;

said plurality of first thin films and said plurality of second thin films are formed of an oxide;

said multilayer film is highly reflective of soft X-rays having a wavelength of 10 nm or less, including wavelengths in a water window zone;

said first thin film is formed by an adsorption and chemical reaction process caused by the introduction of a first vapor comprising an oxidizing agent, and the introduction of a second vapor selected from the group consisting of a metallic compound and a non-metallic compound, the first and second vapors being introduced alternatively, at least one time, into a vacuum container in which a pressure is reduced to a predetermined level or less than the predetermined level;

said second thin film is formed by an adsorption and chemical reaction process caused by the introduction of a third vapor comprising an oxidizing agent, and the introduction of a fourth vapor selected from the group consisting of a metallic compound and a non-metallic compound, the metallic or non-metallic compound of said fourth vapor being different than the metallic or non-metallic compound of said second vapor, the third and fourth vapors being introduced alternatively, at least one time, into the vacuum container in which the pressure is reduced to the predetermined level or less than the predetermined level;

said oxide of said plurality of first thin films is selected from the group consisting of lithium oxide, sodium oxide, calcium oxide, magnesium oxide, and phosphorus oxide; and said oxide of said plurality of second thin films is selected from the group consisting of scandium oxide, rhodium oxide, palladium oxide, vanadium oxide, ruthenium oxide, silver oxide, cadmium oxide, indium oxide, manganese oxide, iron oxide, cobalt oxide, nickel oxide, copper oxide, zinc oxide, gallium oxide, germanium oxide, tin oxide, antimony oxide, tellurium oxide, barium oxide, lanthanum oxide, cerium oxide, praseodymium oxide, neodymium oxide, samarium oxide, europium oxide, gadolinium oxide, lead oxide, tungsten oxide, and molybdenum oxide.

2. A multilayer film structure which is highly reflective of soft X-rays, said multilayer film structure comprising:

a plurality of first thin films; and a plurality of second thin films, each second thin film being formed of a different material than is used to form said plurality of first thin films; wherein said plurality of first thin films and said plurality of second thin films are alternately arranged to form said multilayer film;

said plurality of first thin films and said plurality of second thin films are formed of an oxide;

said oxide of said plurality of first thin films is selected from the group consisting of lithium oxide, sodium oxide, calcium oxide, magnesium oxide, and phosphorus oxide; and said oxide of said plurality of second thin films is selected from the group consisting of scandium oxide, rhodium oxide, palladium oxide, vanadium oxide, ruthenium oxide, silver oxide, cadmium oxide, indium oxide, manganese oxide, iron oxide, cobalt oxide, nickel oxide, copper oxide, zinc oxide, gallium oxide, germanium oxide, tin oxide, antimony oxide, tellurium oxide, barium oxide, lanthanum oxide, cerium oxide, praseodymium oxide, neodymium oxide, samarium oxide, europium oxide, gadolinium oxide, lead oxide, tungsten oxide, and molybdenum oxide.

3. The multilayer film structure as claimed in claim 2, wherein said multilayer film is highly reflective of soft X-rays having a wavelength of 10 nm or less, including wavelengths in a water window zone.

4. The multilayer film structure as claimed in claim 2, wherein said first thin film is formed by an adsorption and chemical reaction process caused by the introduction of a first vapor comprising an oxidizing agent, and the introduction of a second vapor selected from the group consisting of a metallic compound and a non-metallic compound, the first and second vapors being introduced alternatively, at least one time, into a vacuum container in which a pressure is reduced to a predetermined level or less than the predetermined level.

5. The multilayer film structure as claimed in claim 4, wherein said second thin film is formed by an adsorption and chemical reaction process caused by the introduction of a third vapor comprising an oxidizing agent, and the introduction of a fourth vapor selected from the group consisting of a metallic compound and a non-metallic compound, the metallic or non-metallic compound of said fourth vapor being different than the metallic or non-metallic compound of said second vapor, the third and fourth vapors being introduced alternatively, at least one time, into the vacuum container in which the pressure is reduced to the predetermined level or less than the predetermined level.

6. A multilayer film structure which is highly reflective of soft X-rays, said multilayer film structure comprising:

a plurality of first thin films; and a plurality of second thin films, each second thin film being formed of a different material than is used to form said plurality of first thin films; wherein said plurality of first thin films and said plurality of second thin films are alternately arranged to form said multilayer film;

said plurality of first thin films and said plurality of second thin films are formed of an oxide;

said oxide of said plurality of first thin films is selected from the group consisting of titanium oxide, chromium oxide, cesium oxide, and zirconium oxide; and said oxide of said plurality of second thin films is selected from the group consisting of scandium oxide, rhodium oxide, palladium oxide, ruthenium oxide, silver oxide, cadmium oxide, indium oxide, manganese oxide, iron oxide, cobalt oxide, nickel oxide, copper oxide, zinc oxide, gallium oxide, germanium oxide, tellurium oxide, barium oxide, lanthanum oxide, cerium oxide, praseodymium oxide, neodymium oxide, samarium oxide, europium oxide, gadolinium oxide, lead oxide, tungsten oxide, and molybdenum oxide.

7. The multilayer film structure as claimed in claim 6, wherein said first thin film is formed by an adsorption and chemical reaction process caused by the introduction of a first vapor comprising an oxidizing agent, and the introduction of a second vapor selected from the group consisting of a metallic compound and a non-metallic compound, the first and second vapors being introduced alternatively, at least one time, into a vacuum container in which a pressure is reduced to a predetermined level or less than the predetermined level.

8. The multilayer film structure as claimed in claim 7, wherein said second thin film is formed by an adsorption and chemical reaction process caused by the introduction of a third vapor comprising an oxidizing agent, and the introduction of a fourth vapor selected from the group consisting of a metallic compound and a non-metallic compound, the metallic or non-metallic compound of said fourth vapor being different than the metallic or non-metallic compound of said second vapor, the third and fourth vapors being introduced alternatively, at least one time, into the vacuum container in which the pressure is reduced to the predetermined level or less than the predetermined level.

9. The multilayer film structure as claimed in claim 6, wherein said multilayer film is highly reflective of soft X-rays having a wavelength of 10 nm or less, including wavelengths in a water window zone.

10. The multilayer film formed by as claimed in claim 9, wherein said first thin film is formed by an adsorption and chemical reaction process caused by the introduction of a first vapor comprising an oxidizing agent, and the introduction of a second vapor selected from the group consisting of a metallic compound and a non-metallic compound, the first and second vapors being introduced alternatively, at least one time, into a vacuum container in which a pressure is reduced to a predetermined level or less than the predetermined level.

11. The multilayer film structure as claimed in claim 10, wherein said second thin film is formed by an adsorption and chemical reaction process caused by the introduction of a third vapor comprising an oxidizing agent, and the introduction of a fourth vapor selected from the group consisting of a metallic compound and a non-metallic compound, the metallic or non-metallic compound of said fourth vapor being different than the metallic or non-metallic compound of said second vapor, the third and fourth vapors being introduced alternatively, at least one time, into the vacuum container in which the pressure is reduced to the predetermined level or less than the predetermined level.

* * * * *